(12) United States Patent
Stamenov

(10) Patent No.: US 10,422,976 B2
(45) Date of Patent: Sep. 24, 2019

(54) ABERRATION CORRECTED OPTICAL SYSTEM FOR NEAR-EYE DISPLAYS

(71) Applicant: Samsung Electronics Co., Ltd., Gyeonggi-Do (KR)

(72) Inventor: Igor Stamenov, San Jose, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 80 days.

(21) Appl. No.: 15/420,389

(22) Filed: Jan. 31, 2017

(65) Prior Publication Data

US 2017/0248769 A1 Aug. 31, 2017

Related U.S. Application Data

(60) Provisional application No. 62/300,692, filed on Feb. 26, 2016.

(51) Int. Cl.
*G02B 27/02* (2006.01)
*G02B 9/12* (2006.01)
(Continued)

(52) U.S. Cl.
CPC ............ *G02B 9/12* (2013.01); *G02B 25/001* (2013.01); *G02B 27/0025* (2013.01); *G02B 27/027* (2013.01)

(58) Field of Classification Search
CPC .................. G02B 27/027; G02B 25/001; G02B 27/0025; G02B 23/14; G02B 13/18; G02B 13/16; G02B 15/177; G02B 9/12–9/32; G02B 13/04; G02B 13/0035; G02B 3/04; G02B 25/00
(Continued)

(56) References Cited

U.S. PATENT DOCUMENTS 4,406,532 A 9/1983 Howlett
4,623,224 A 11/1986 Clarke
(Continued)

FOREIGN PATENT DOCUMENTS

EP 1906399 A1 4/2008
JP 2011145488 A 7/2011
(Continued)

OTHER PUBLICATIONS

"PIMAX Announces World's First 8K VR Headsent," [online] VR World © 2017, Jan. 30, 2017, retrieved from the Internet: <http://vrworld.com/2017/01/30/pimax-8k-vr-headset/>, 3 pg.
(Continued)

*Primary Examiner* — William R Alexander
*Assistant Examiner* — Henry A Duong
(74) *Attorney, Agent, or Firm* — Cuenot, Forsythe & Kim, LLC

(57) ABSTRACT

An optical system includes, from an image side to an object side, a first lens having a positive refractive power, a second lens having a positive refractive power, and a third lens having a negative refractive power. The first lens, the second lens, and the third lens form an optical path with the object side facing a screen and the image side adapted to provide an image from the screen to a user. In one aspect, the optical system is adapted to correct at least one of a group of aberrations including astigmatism and field curvature; or, lateral color.

23 Claims, 16 Drawing Sheets

(51) Int. Cl.
*G02B 25/00* (2006.01)
*G02B 27/00* (2006.01)

(58) Field of Classification Search
USPC ....... 359/645, 682, 689–690, 716, 748, 753, 359/784–792
See application file for complete search history.

(56) References Cited

U.S. PATENT DOCUMENTS

| | | | |
|---|---|---|---|
| 5,347,400 A | 9/1994 | Hunter | |
| 5,633,757 A | 5/1997 | Park | |
| 6,542,316 B2 | 4/2003 | Yoneyama | |
| 6,563,648 B2 | 5/2003 | Gleckman et al. | |
| 7,667,901 B2 | 2/2010 | Baba | |
| 8,994,614 B2 | 3/2015 | Bickerstaff et al. | |
| 9,123,158 B2 | 9/2015 | Nishimaki et al. | |
| 9,151,934 B2 | 10/2015 | Saito et al. | |
| 9,152,226 B2 | 10/2015 | Forutanpour et al. | |
| 9,176,304 B2 | 11/2015 | Asami et al. | |
| 9,182,569 B2 | 11/2015 | Jung et al. | |
| 9,195,029 B2 | 11/2015 | Kim et al. | |
| 9,229,227 B2 | 1/2016 | Border et al. | |
| 2010/0128355 A1 | 5/2010 | Janeczko et al. | |
| 2012/0212839 A1* | 8/2012 | Hsu | G02B 9/12 359/716 |
| 2014/0218806 A1 | 8/2014 | Kenichi | |
| 2014/0266990 A1 | 9/2014 | Makino et al. | |
| 2014/0268354 A1 | 9/2014 | Choi et al. | |
| 2015/0193983 A1 | 7/2015 | Katz et al. | |
| 2015/0234455 A1 | 8/2015 | Lavalle et al. | |
| 2015/0293330 A1 | 10/2015 | Gutierrez | |
| 2015/0302651 A1 | 10/2015 | Shpigelman | |
| 2015/0312465 A1 | 10/2015 | Javaheri et al. | |
| 2015/0312468 A1 | 10/2015 | Taylor et al. | |
| 2015/0348327 A1 | 12/2015 | Zalewski | |
| 2015/0355467 A1 | 12/2015 | Mukawa et al. | |
| 2016/0011422 A1* | 1/2016 | Thurber | G02B 27/64 345/8 |
| 2016/0011424 A1 | 1/2016 | Thurber et al. | |
| 2016/0019727 A1 | 1/2016 | Norton et al. | |
| 2016/0198949 A1 | 7/2016 | Spitzer | |
| 2017/0039904 A1 | 2/2017 | Jepsen | |
| 2017/0109562 A1 | 4/2017 | Shroff et al. | |
| 2017/0115432 A1 | 4/2017 | Schmidtlin | |
| 2017/0115489 A1 | 4/2017 | Xinda et al. | |
| 2017/0139213 A1 | 5/2017 | Schmidtlin | |
| 2017/0177937 A1 | 6/2017 | Harmsen et al. | |
| 2017/0180800 A1 | 6/2017 | Mayrand | |
| 2017/0184877 A1* | 6/2017 | Wang | G02B 13/003 |
| 2017/0205627 A1 | 7/2017 | Fukuyama | |
| 2017/0236249 A1 | 8/2017 | Roulet et al. | |
| 2017/0287215 A1 | 10/2017 | Lalonde et al. | |

FOREIGN PATENT DOCUMENTS

| | | | |
|---|---|---|---|
| JP | 2012510077 A | 4/2012 | |
| KR | 100141805 B1 | 8/1998 | |
| KR | 20100000757 A | 1/2010 | |
| KR | 101118910 B1 | 3/2012 | |
| KR | 101421199 B1 | 7/2014 | |
| KR | 101590825 B1 | 2/2016 | |
| KR | 20170104604 A | 9/2017 | |
| KR | 20180039734 A | 4/2018 | |
| WO | 2013027855 A1 | 2/2013 | |
| WO | 2015021322 A1 | 2/2015 | |
| WO | 2015057994 A1 | 4/2015 | |
| WO | 2016014878 A1 | 1/2016 | |
| WO | 2016118648 A1 | 7/2016 | |
| WO | 2017146510 A2 | 8/2017 | |

OTHER PUBLICATIONS

"LeepVR," [online] LeepVR.com, retrieved Jan. 31, 2018, retrieved from the Internet: <http://www.leepvr.com/about.php>, 4 pg.

"L-3 GPNVG ANVIS Mount," [Online] Global Tactical © 2015, 3 pg.

Heinrich, E., "VR Union Claire—The Virtual Reality headset that's more Immersive than Oculus Rift," [online] Fortune, Time, Inc. © 2018, Mar. 3, 2015, 4 pg.

Boxall, A., "Infinitus puts the Rift and Vive to shame with its new, high-resolution prime TVR headset," [online] Digital Trends, Designtechnica Corporation © 2018 May 6, 2016, 9 pg.

Clark, "Mobile platform optical design," In International Optical Design Conference, pp. 92931M-92931M, International Society for Optics and Photonics, Dec. 17, 2014.

WIPO Appln. PCT/KR2017/002034, Int'l Search Report and Written Opinion, dated May 15, 2017, 13 pg.

EP Appln. 17756858.2, European Extended Search Report, dated Jan. 24, 2019, 7 pg.

WIPO Appln. PCT/KR2018/011686, International Search Report and Written Opinion, dated Jan. 31, 2019, 10 pg.

"StarVR," [online] StarVR Corporation [retrieved Oct. 9, 2017], retrieved from the Internet: <https://www.starvr.com>, 6 pg.

* cited by examiner

ABERRATION CORRECTED OPTICAL SYSTEM FOR NEAR-EYE DISPLAYS

CROSS-REFERENCE TO RELATED APPLICATIONS

This application claims the benefit of U.S. Provisional Patent Application No. 62/300,692 filed on Feb. 26, 2016, which is fully incorporated herein by reference.

TECHNICAL FIELD

This disclosure relates to optical systems and, more particularly, to optical systems with multiple lenses adapted to correct a variety of aberrations.

BACKGROUND

Virtual Reality, or "VR," refers to computer-based technologies that seek to generate realistic images, sounds, and sensations in an attempt to replicate an environment. A user is immersed into the environment by being subjected to the images, sounds, and sensations as if the user had a physical presence in the environment. The user is also able to interact with the computer-generated environment and interact with depictions of objects located within the computer-generated environment.

In order to create an immersive and realistic experience for the user, a VR headset may be used. Typically, the VR headset includes a stereoscopic, head-mounted display, lenses, and head motion tracking sensors. The lenses are arranged to act as a stereoscope for viewing the stereoscopic display. Due to various concerns relating to weight, size, wearability, and cost of the VR headset, compromises in lenses have become commonplace.

In consequence, the lenses used in VR headsets typically generate images with multiple aberrations. These aberrations may include field curvature, astigmatism, lateral color, etc. As such, the VR user experience tends to be acceptable only when the user watches content straight ahead at the center of the field of view (FOV) of the stereoscopic display. Imagery positioned toward the periphery of the FOV is blurred with high field and color aberration causing eye strain, nausea, and user discomfort. Blurring of imagery at the periphery also causes eye accommodation difficulty and further contributes to VR sickness.

SUMMARY

One or more embodiments are directed to optical systems. In one aspect, an optical system for producing an image can include, from an image side to an object side, a first lens having a positive refractive power, a second lens having a positive refractive power, and a third lens having a negative refractive power. The first lens, the second lens, and the third lens form an optical path with the object side facing a screen and the image side adapted to provide an image from the screen to a user.

In another aspect, an optical system for producing an image includes a plurality of lenses forming an optical path having an object side facing a screen and an image side adapted to provide an image from the screen to a user. The plurality of lenses are adapted to correct at least one of a group of aberrations including astigmatism and field curvature; or, lateral color.

One or more embodiments are directed to methods of implementing an optical system. In an aspect, a method includes locating a first lens having a positive refractive power at an image side of an optical path, providing a second lens having a positive refractive power, and locating a third lens having a negative refractive power at an object side of the optical path. The second lens is positioned between the first lens and the third lens. The first lens, the second lens, and the third lens form the optical path with the object side facing a screen and the image side adapted to provide an image from the screen to a user.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings.

DETAILED DESCRIPTION

Figure 1A:
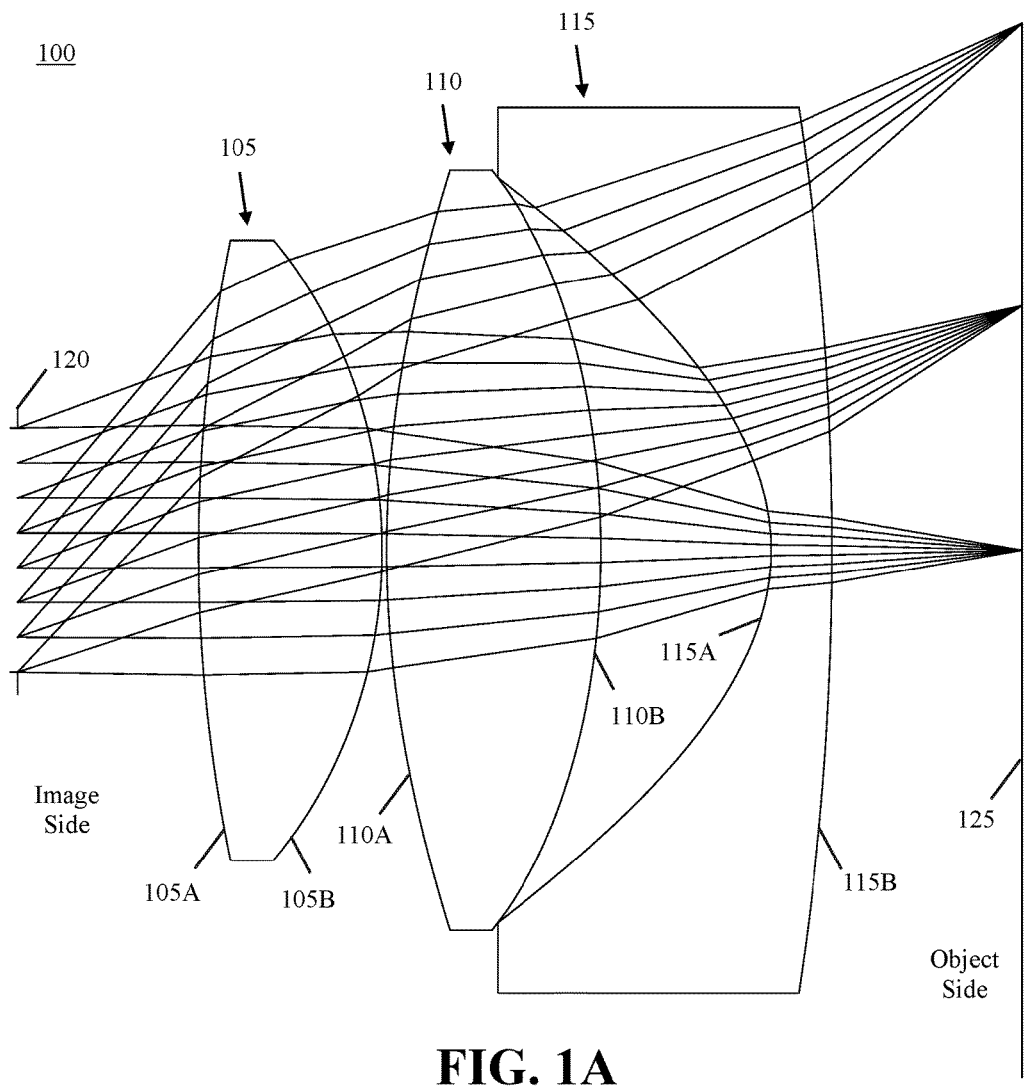
FIG. 1A illustrates an example optical system.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to optical systems and, more particularly, to optical systems with multiple lenses. One or more embodiments described within this disclosure are directed to optical systems adapted to correct for various aberrations. These aberrations can include, but are not limited to, field curvature, astigmatism, and/or lateral color. Example embodiments disclosed herein have a plurality of lenses. In one or more embodiments, optical systems include three (3) lenses. The example optical systems disclosed herein provide a wide field of view (FOV), thereby correcting for astigmatism, field curvature, and/or eliminating lateral color aberration.

In one or more embodiments, the optical systems disclosed herein are adapted for use as eyepieces. These eyepieces may be implemented as modules. The modules may be incorporated into a head-mountable assembly for virtual reality (VR). For purposes of discussion, a head-mountable assembly for VR may be referred to herein from time-to-time as a "VR headset." The modules may be implemented as removable modules so that the modules may be removed and/or replaced within the VR headset. For example, each eyepiece, or module, may be implemented as an instance of an optical system described herein. Appreciably, the optical systems may be matched for purposes of implementing the eyepieces. Example embodiments disclosed herein can provide an improved optical train by introduction of an anastigmatic lens system capable of correcting for spherical aberration, coma, and astigmatism.

In one or more embodiments, the various objectives described herein are accomplished while maintaining a reasonable or reduced weight. The example embodiments described herein have a weight of approximately 74.9 grams or less. Further, the simulated image quality of the example optical systems described within this disclosure attenuates, or may eliminate, user eyestrain, user discomfort, nausea, and VR sickness while providing high image quality and improved user experience across the whole FOV.

In one or more embodiments, example optical systems described herein may be implemented to satisfy one or more or any combination of expressions 1-18 below.

$$0.8 < f1/f < 2.2 \tag{1}$$

$$0.8 < f2/f < 1.9 \tag{2}$$

$$-1.0 < f3/f < -0.4 \tag{3}$$

$$0.4 < f1/f2 < 2.0 \tag{4}$$

$$-3.0 < f2/f3 < -0.8 \tag{5}$$

$$|Vd2 - Vd3| > 24 \tag{6}$$

$$1.0 < OAL/f < 1.8 \tag{7}$$

$$0.0 < D1/f < 0.2 \tag{8}$$

$$0.0 < D2/f < 0.4 \tag{9}$$

$$0.2 < BFL/f < 0.9 \tag{10}$$

$$-1.0 < r2/f < -0.2 \tag{11}$$

$$0.5 < r3/f < 2.5 \tag{12}$$

$$-5.0 < r4/f < -0.5 \tag{13}$$

$$-20 < r5/f < -0.5 \tag{14}$$

Within this specification, "f" is the overall focal length of the optical system, "f1" is the focal length of the lens most proximal to the placement of the user's eye (also referred to as the first lens), "f2" is the focal length of the middle lens (also referred to as the second lens), "f3" is the focal length of the most distal lens from the placement of the user's eye (also referred to as the third lens). "OAL" is the distance from the image side surface (e.g., the left or "A" surface) of the first lens to a surface of a screen, "BFL" is the distance from the image side surface (e.g., the right or "B" surface) of the third lens to the surface of the screen. Further, Vd1 is the Abbe number of the optical material of the first lens, Vd2 is the Abbe number of the optical material of the second lens, and Vd3 is the Abbe number of the optical material of the third lens. D1 is the air space thickness between the center of the first lens and the center of the second lens. D2 is the air space thickness between the center of the second lens and the center of the third lens. Finally, "r2" is the radius of curvature of the object side surface of the first lens, "r3" is the radius of curvature of the image side surface of the second lens, "r4" is the radius of curvature of the object side surface of the second lens, and "r5" is the radius of curvature of the image side surface of the third lens.

Further aspects of the inventive arrangements are described in greater detail below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1A illustrates an example optical system 100. Optical system 100 includes a first lens 105, a second lens 110, and a third lens 115. Each of lenses 105, 110, and 115 has an image side surface labeled "A" and an object side surface labeled "B." Surface 120 represents a location or position of the eye box. Surface 125 represents a surface of one or more screens (e.g., where the screens are aligned in a plane represented by surface 125). In one aspect, one or more screens are integrated into a VR headset. In that case, for example, the screen(s) are not removable. In another aspect, the screen is part of a display device that may be used with the VR headset. In this latter example, the display device is removable from the VR headset. Appreciably, a display device may include one or more screens. Optical system 100 provides an optical path formed by lenses 105, 110, and 115.

In the example of FIG. 1A, lens 105 is the lens that is the most proximal lens of optical system 100 to the placement of the user's eye (e.g., the image side). The left side of lens 105 may be referred to as the image side. Lens 105 can have positive refractive power. In an embodiment, lens 105 may be a positive biconvex lens.

Lens 110 is disposed between lens 105 and lens 115 in the optical path. Lens 110 may be implemented with positive refractive power. In an embodiment, lens 110 may be implemented as a positive biconvex lens.

Lens 115 is the most distal lens from the placement of the user's eye. As such, lens 115 is on the object side of the optical path and is the most proximal lens of optical system 100 to the object side. Lens 115 is implemented with negative refractive power. In an embodiment, lens 115 is implemented as a negative meniscus lens. In one or more other embodiments, lens 115 has a center portion that has a negative meniscus shape and an outer portion that has a different shape.

As used herein, a positive (or negative) lens refers to a lens that is positive (or negative) in terms of refractive power for a center portion of the lens. As such, a positive (or negative) lens can have an outer portion that becomes negative (or positive).

In one example implementation, lens 115 is an aspherical optical element that may use up to $16^{th}$ order even aspherical terms to describe the surface shape. Rotationally symmetric polynomial aspheric surfaces are described by a polynomial expansion of the deviation from spherical (or aspheric described by a conic) surface. The even aspherical surface model uses the base radius of curvature and the conic constant. The surface sag "z" is given by Expression 15 below:

$$z = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16} \quad (15)$$

Within Expression 15, the term "r" represents the radial coordinate of the lens.

In one or more embodiments, lens 105 and lens 110 each have $10^{th}$ order even aspheric surfaces. Lens 105 and lens 110 each may have up to $16^{th}$ order even aspheric terms in alternative embodiments. Optical system 100 is capable of providing a diagonal field of view (DFOV) of ±50.5°(101°) and a ±34.8 mm (69.6 mm) maximum screen object size. In one or more embodiments, optical system 100 may be used within a VR headset that is adapted to include one or more screens or receive a display device having a screen. In one example, the display device includes a single screen implemented as an LCD/OLED screen used as a stereoscopic display. Examples of a display device may include, but are not limited to, a cell phone, a mobile phone, a portable computing device, a mobile device, etc. Optical system 100 may be scaled larger (or smaller) thereby resulting in a scaling of the screen image size larger (or smaller).

Optical system 100 is capable of providing an eye relief of 11.8 mm and an eye box diameter of 16 mm for the user pupil. In general, the eye relief of an optical instrument such as optical system 100 can correspond to the distance from the last surface of an eyepiece at which the user's eye can obtain the full viewing angle. A human eye pupil diameter may vary between approximately 2 mm under bright light conditions up to approximately 8 mm when fully dilated in darkness. A common size of the human eye pupil is 4-5 mm. In this example, the 16 mm eye box size is used to account for eye pupil movement with gaze change. Eye relief of 11.8 mm allows a VR headset using optical system 100 for each eyepiece to be used with eyeglasses and/or spectacles.

Table 1 provides an example of an optical prescription for optical system 100.

TABLE 1

| | Description | Surface Type | Radius [mm] | Thickness [mm] | Semi-Diameter [mm] | Conic |
|---|---|---|---|---|---|---|
| 0 | — | Standard | Infinity | Infinity | Infinity | 0.0000 |
| 1 | Eye pupil (surface 120) | Standard | Infinity | 11.8000 | 8.000 | 0.0000 |
| 2 | Lens 105, surface 105A | Standard | 100.0000 | 12.0100 | 21.5000 | 0.0000 |
| 3 | Lens 105, surface 105B | Standard | −33.9621 | 0.3000 | 21.5000 | 0.3704 |
| 4 | Lens 110, surface 110A | Standard | 69.0280 | 14.0100 | 24.9000 | −3.8894 |
| 5 | Lens 110, surface 110B | Standard | −56.3858 | 11.1100 | 24.9000 | 2.6436 |
| 6 | Lens 115, surface 115A | Standard | −14.5535 | 4.0000 | 24.4000 | −1.2361 |
| 7 | Lens 115, surface 115B | Standard | −193.2856 | 12.4000 | 29.0000 | 0.0000 |
| 8 | Screen (surface 125) | Standard | Infinity | — | 35.0000 | 0.0000 |

Table 2 illustrates a variety of additional characteristics of optical system 100. For example, Table 2 shows the overall focal length of optical system 100 (f); the focal length of each of lenses 105, 110, and 115 (f-105, f-110, f-115); the refractive index (n) of each of lenses 105, 110, and 115 (n-105, n-110, and n-115); and the Abbe number (Vd) of each of lenses 105, 110, and 115 (Vd-105, Vd-110, and Vd-115).

TABLE 2

| | |
|---|---|
| f | 47.1 mm |
| f-105 (corresponding to f1) | 49.6 mm |
| f-110 (corresponding to f2) | 61.2 mm |
| f-115 (corresponding to f3) | −25.9 mm |
| n-105 | 1.525 |
| n-110 | 1.525 |
| n-115 | 1.608 |
| Vd-105 (corresponding to Vd1) | 55.95 |
| Vd-110 (corresponding to Vd2) | 55.95 |
| Vd-115 (corresponding to Vd3) | 26.90 |

Optical system 100 may use a variety of different lens materials to implement lenses 105, 110, and 115. In one example, each of lenses 105, 110, and 115 may be implemented using a same material, e.g., optical plastic or optical glass. In another example, two of lenses 105, 110, and 115 are implemented using optical plastic (optical glass), while the other one of lenses 105, 110, and 115 is implemented using optical glass (optical plastic). It should be appreciated that the particular optical plastic and/or particular optical glass used may differ between lenses.

In one or more embodiments, one or more or all of lenses 105, 110, and 115 are implemented using an optical plastic. In an example embodiment, lens 105 is implemented using 480R; lens 110 is implemented using 480R; and lens 115 is implemented using Osaka Gas Chemicals polyester (OKP optical plastic) 4 (OKP4). In this example, the weight of optical system 100 is approximately 74.9 grams.

An optical system 100 as described in connection with FIG. 1A may be implemented to satisfy the expressions illustrated in Table 3 to provide improved optical performance.

TABLE 3

| Expression | Value |
|---|---|
| OAL [mm] | 53.83 |
| BFL [mm] | 12.40 |
| D1 [mm] | 0.30 |
| D2 [mm] | 11.11 |
| f1/f | 10.54 |
| f2/f | 1.30 |
| f3/f | −0.55 |
| f1/f2 | 0.81 |
| f2/f3 | −2.36 |
| V2−V3 | 29.05 |
| OAL/f | 1.14 |
| BFL/f | 0.26 |
| r2/f | −0.72 |
| r3/f | 1.47 |
| r4/f | −1.20 |
| r5/f | −0.31 |
| D1/f | 0.006 |
| D2/f | 0.236 |

Figure 1B:
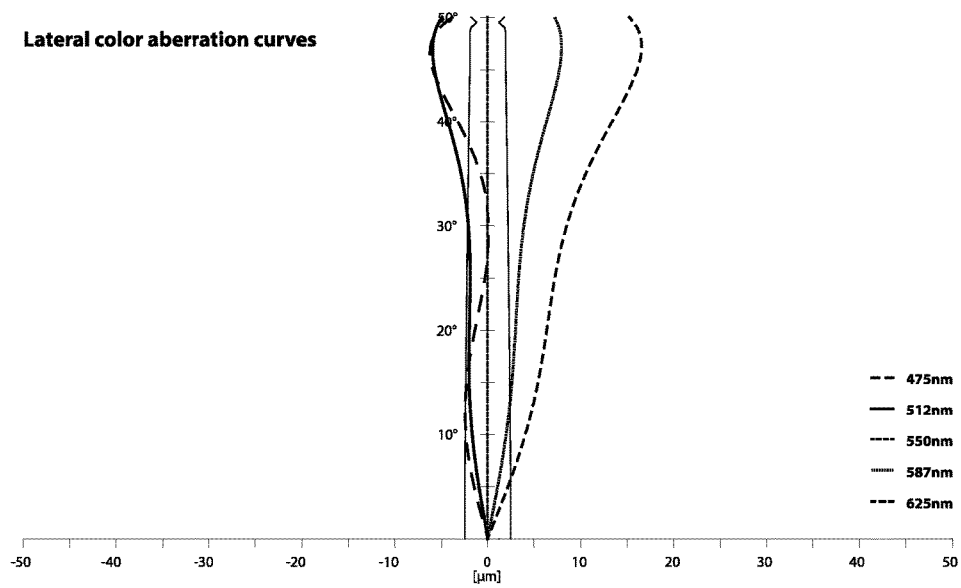
FIG. 1B illustrates lateral color aberration for the optical system of FIG. 1A on the screen (object) side in micrometers.
Figure 1C:
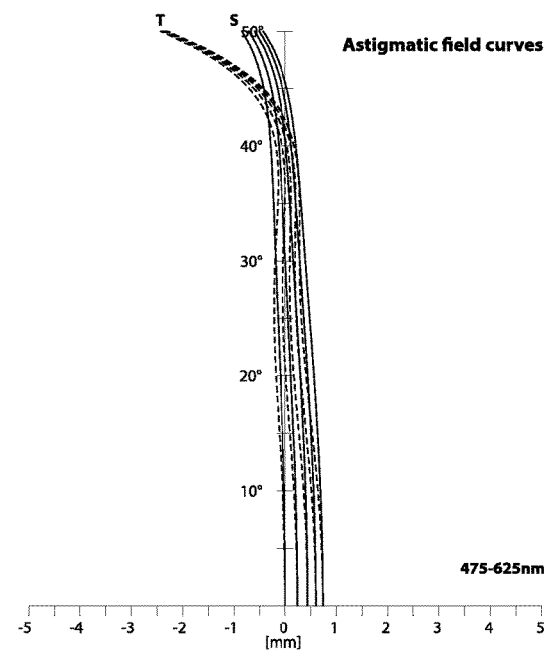
FIG. 1C illustrates field curvature and astigmatism aberrations for the optical system of FIG. 1A on the screen side in millimeters.
Figure 1D:
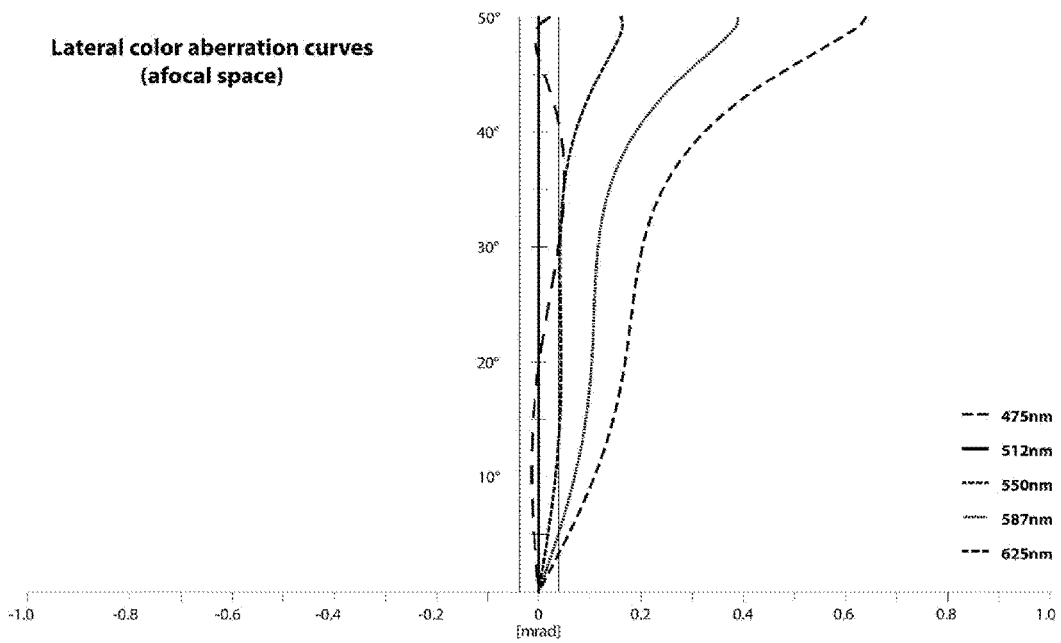
FIG. 1D illustrates lateral color aberration for the optical system of FIG. 1A on the user eye (image) side in milliradians (afocal space).
Figure 1E:
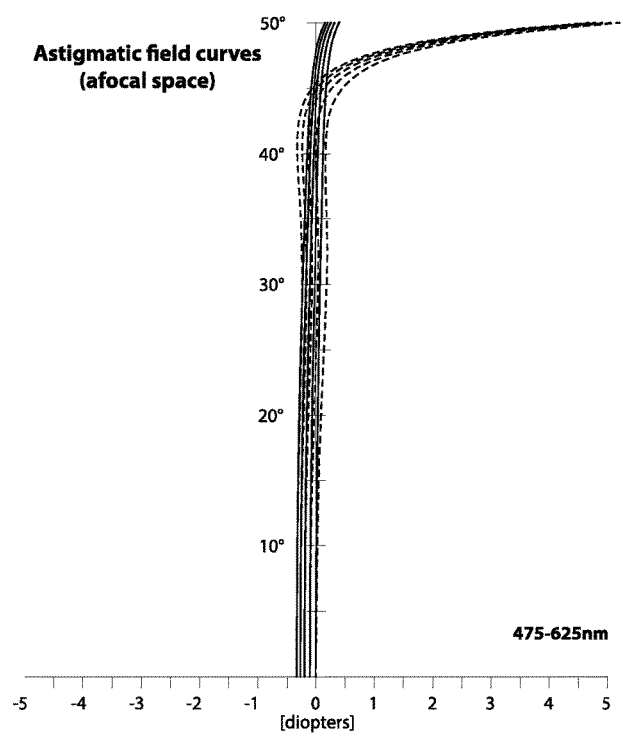
FIG. 1E illustrates field curvature and astigmatism for the optical system of FIG. 1A on the image side in diopter units (afocal space).

FIG. 1B illustrates lateral color aberration for optical system 100 of FIG. 1A on the screen side in micrometers. FIG. 1C illustrates field curvature and astigmatism aberrations for optical system 100 of FIG. 1A on the screen side in millimeters. FIG. 1D illustrates lateral color aberration for optical system 100 of FIG. 1A on the image side in milliradians (afocal space). FIG. 1E illustrates field curvature and astigmatism for optical system 100 of FIG. 1A on the image side in diopter units (afocal space).

Figure 2A:
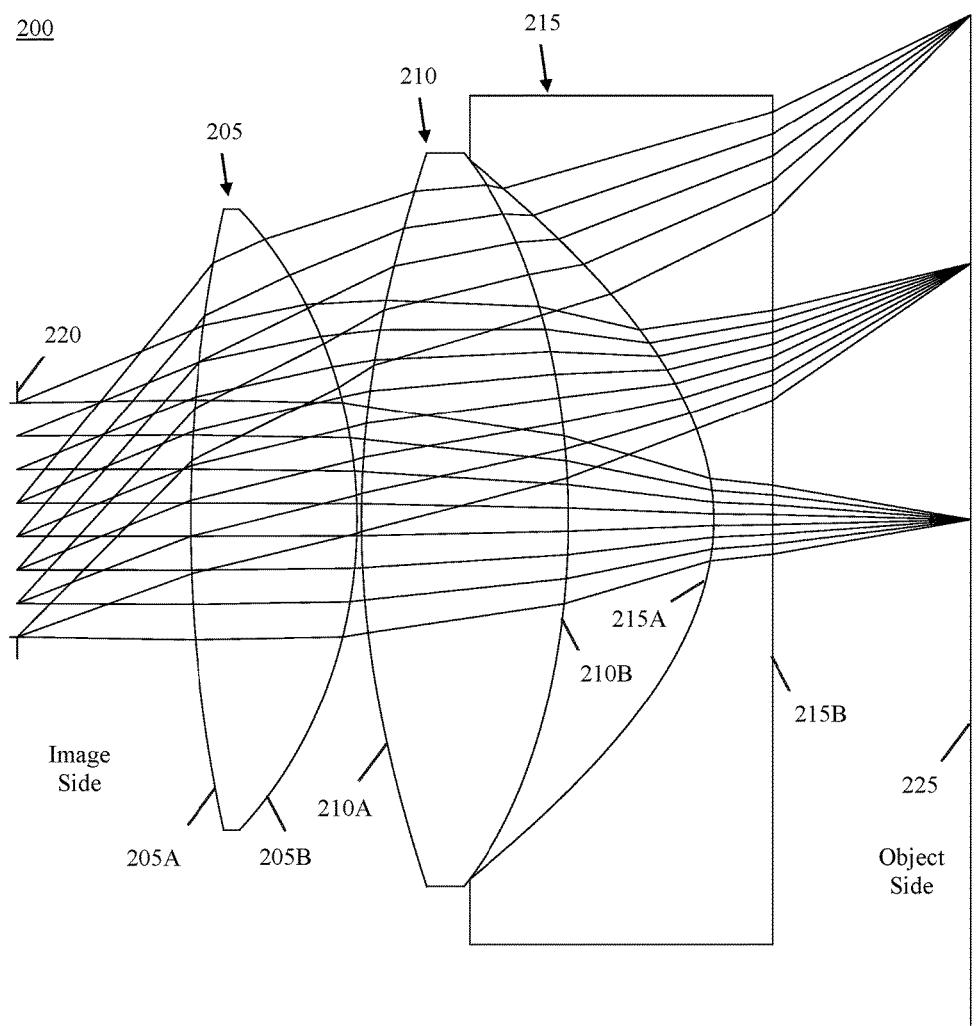
FIG. 2A illustrates another example optical system.

FIG. 2A illustrates another example optical system 200. Optical system 200 has a weight that is approximately 10% less than the weight of optical system 100. Optical system 200, however, provides less robust color correction than optical system 100. Optical system 200 includes a first lens 205, a second lens 210, and a third lens 215. Each of lenses 205, 210, and 215 has an image side surface labeled "A" and an object side surface labeled "B." Surface 220 represents the location or position of the eye box. Surface 225 represents the surface of one or more screens. In one aspect, one or more screens are integrated into a VR headset. In that case, for example, the screen(s) are not removable. In another aspect, the screen is part of a display device that may be used with the VR headset. In this latter example, the display device is removable from the VR headset. Appreciably, the display device may include one or more screens. Optical system 200 provides an optical path formed by lenses 205, 210, and 215.

In the example of FIG. 2A, lens 205 is the lens that is the most proximal lens of optical system 200 to the placement of the user's eye. Lens 205 can be implemented as a positive lens. In an embodiment, lens 205 is implemented as a positive bi-convex lens. In another embodiment, lens 205 is implemented as a positive meniscus lens.

Lens 210 is disposed between lens 205 and lens 215 in the optical path. Lens 210 may be implemented as a positive lens. Lens 210 further may be implemented as a positive aspheric lens.

Lens 215 is the most distal lens from the placement of the user's eye. As such, lens 215 is on the object side of the optical path and is the most proximal lens of optical system 200 to the object side. Lens 215 is implemented as a negative lens.

Optical system 200 is capable of providing a DFOV of ±50.5° (101°) and ±35.2 mm (70.4 mm) maximum screen object size. In one or more embodiments, optical system 200 may be used within a VR headset that is adapted to include one or more screen(s) or receive a display device having a screen. In one example, the display device includes a single screen implemented as an LCD/OLED screen used as a stereoscopic display. Examples of a display device may include, but are not limited to, a cell phone, a mobile phone, a portable computing device, a mobile device, etc. Optical system 200 may be scaled larger (or smaller) thereby resulting in a scaling of the screen image size larger (or smaller). Optical system 200 is capable of providing an eye relief of 11.8 mm and an eye box diameter of 16 mm for the user pupil. Eye relief of 11.8 mm allows a VR headset using optical system 200 for each eyepiece to be used with eyeglasses and/or spectacles.

Table 4 below provides an example of an optical prescription for optical system 200.

TABLE 4

| | Description | Surface Type | Radius [mm] | Thickness [mm] | Semi-Diameter [mm] | Conic |
|---|---|---|---|---|---|---|
| 0 | — | Standard | Infinity | Infinity | Infinity | 0.0000 |
| 1 | Eye pupil (surface 220) | Standard | Infinity | 11.8000 | 8.000 | 0.0000 |
| 2 | Lens 205, surface 205A | Standard | 100.0000 | 11.3400 | 21.2000 | 0.0000 |
| 3 | Lens 205, surface 205B | Standard | −33.5925 | 0.3000 | 21.2000 | 0.1081 |

TABLE 4-continued

| Description | Surface Type | Radius [mm] | Thickness [mm] | Semi-Diameter [mm] | Conic |
|---|---|---|---|---|---|
| 4 Lens 210, surface 210A | Standard | 64.2690 | 14.1100 | 25.0500 | −4.3349 |
| 5 Lens 210, surface 210B | Standard | −57.0110 | 9.8900 | 25.0500 | 2.8585 |
| 6 Lens 215, surface 215A | Standard | −16.1781 | 4.0000 | 24.5000 | −1.2114 |
| 7 Lens 215, surface 215B | Standard | Infinity | 13.5000 | 29.0000 | 0.0000 |
| 8 Screen (surface 225) | Standard | Infinity | — | 35.0000 | 0.0000 |

Table 5 illustrates a variety of additional characteristics of optical system 200. For example, Table 5 shows the overall focal length of optical system 200 (f); the focal length of each of lenses 205, 210, and 215 (f-205, f-210, f-215); the refractive index of each of lenses 205, 210, and 215 (n-205, n-210, and n-215); and the Abbe number of each of lenses 205, 210, and 215 (Vd-205, Vd-210, and Vd-215).

TABLE 5

| f | 46.1 mm |
|---|---|
| f-205 (corresponding to f1) | 49.1 mm |
| f-210 (corresponding to f2) | 59.7 mm |
| f-215 (corresponding to f3) | −27.2 mm |
| n-205 | 1.525 |
| n-210 | 1.525 |
| n-215 | 1.590 |
| Vd-205 (corresponding to Vd1) | 55.95 |
| Vd-210 (corresponding to Vd2) | 55.95 |
| Vd-215 (corresponding to Vd3) | 30.86 |

In another aspect, optical system 200 may use a variety of different lens materials to implement lenses 205, 210, and 215. In one example, each of lenses 205, 210, and 215 is implemented using a same material, e.g., optical plastic or optical glass. In another example, two of lenses 205, 210, and 215 are implemented using optical plastic (optical glass), while the other one of lenses 205, 210, and 215 is implemented using optical glass (optical plastic). It should be appreciated that the particular optical plastic and/or particular optical glass used may differ between lenses.

In one or more embodiments, one or more or all of lenses 205, 210, and 215 may be implemented using an optical plastic. In an example embodiment, lens 205 is implemented using 480R; lens 210 is implemented using 480R; and lens 215 is implemented using Polystyrene. In this example, the weight of optical system 200 is approximately 68 grams.

An optical system 200 as described in connection with FIG. 2A may be implemented to satisfy the expressions illustrated in Table 6 to provide improved optical performance.

TABLE 6

| Expressions | Value |
|---|---|
| OAL [mm] | 53.14 |
| BFL [mm] | 13.50 |
| D1 [mm] | 0.30 |
| D2 [mm] | 9.89 |
| f1/f | 1.06 |
| f2/f | 1.30 |
| f3/f | −0.59 |
| f1/f2 | 0.82 |
| f2/f3 | −2.20 |
| V2−V3 | 25.09 |
| OAL/f | 1.15 |
| BFL/f | 0.29 |
| r2/f | −0.73 |
| r3/f | 1.39 |

TABLE 6-continued

| Expressions | Value |
|---|---|
| r4/f | −1.24 |
| r5/f | −0.35 |
| D1/f | 0.007 |
| D2/f | 0.214 |

Figure 2B:
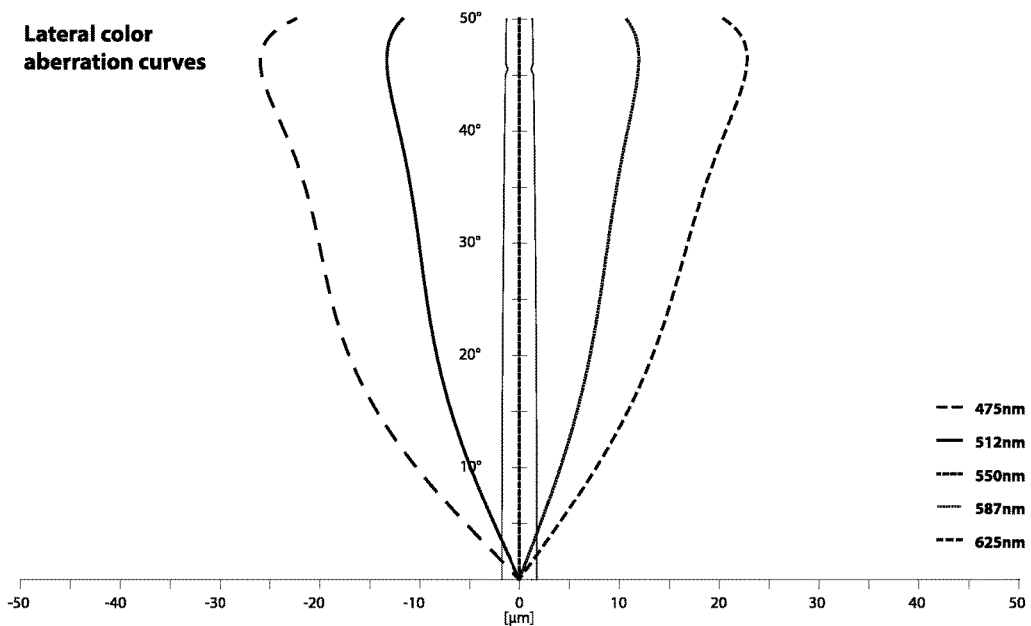
FIG. 2B illustrates lateral color aberration for the optical system of FIG. 2A on the screen side in micrometers.
Figure 2C:
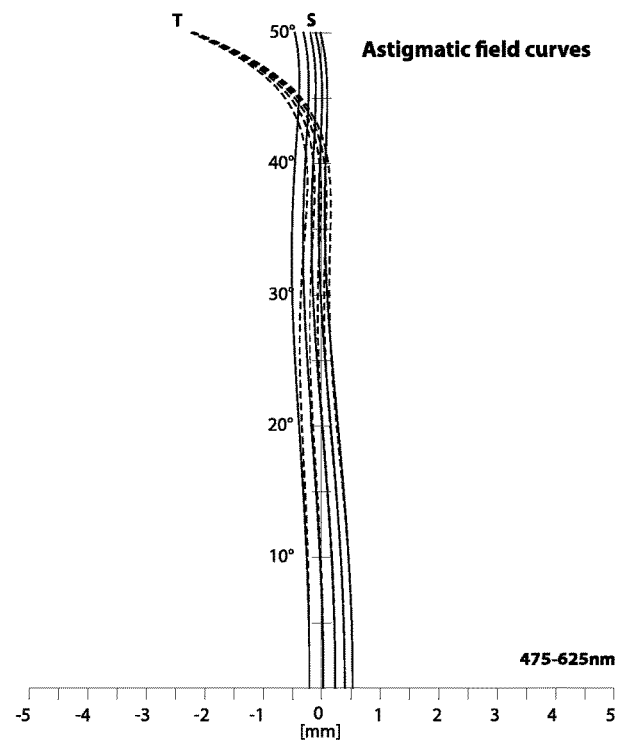
FIG. 2C illustrates field curvature and astigmatism aberrations for the optical system of FIG. 2A on the screen side in millimeters.
Figure 2D:
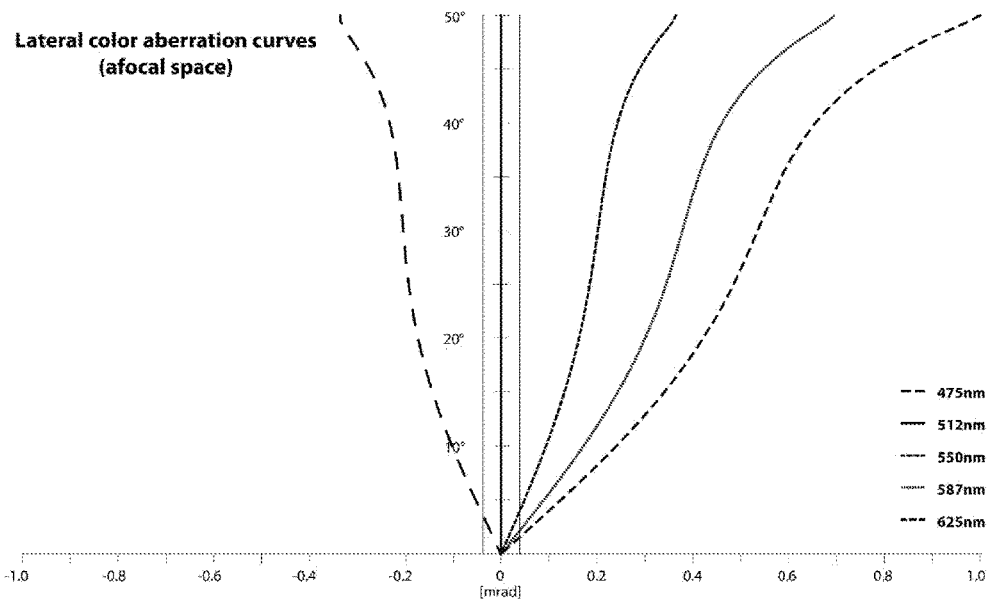
FIG. 2D illustrates lateral color aberration for the optical system of FIG. 2A on the image side in milliradians (afocal space).
Figure 2E:
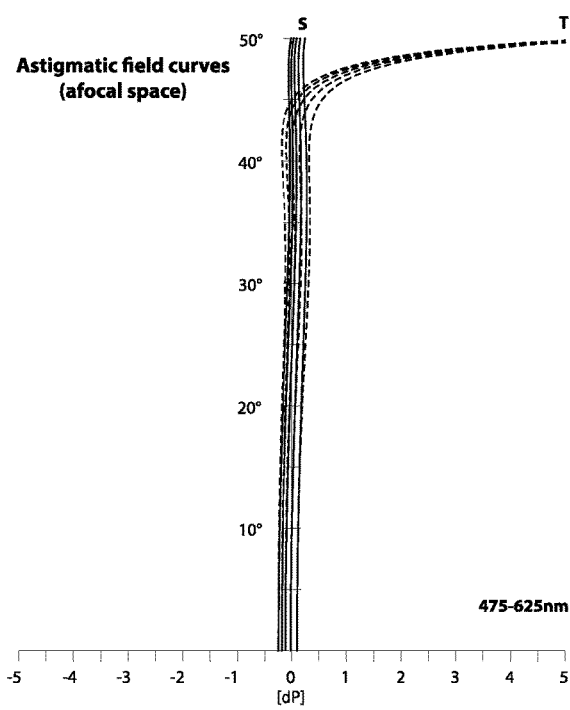
FIG. 2E illustrates field curvature and astigmatism for the optical system of FIG. 2A on the image side in diopter units (afocal space).

FIG. 2B illustrates lateral color aberration for optical system 200 of FIG. 2A on the screen side in micrometers. FIG. 2C illustrates field curvature and astigmatism aberrations for optical system 200 of FIG. 2A on the screen side in millimeters. FIG. 2D illustrates lateral color aberration for optical system 200 of FIG. 2A on the image side in milliradians (afocal space). FIG. 2E illustrates field curvature and astigmatism for optical system 200 of FIG. 2A on the image side in diopter units (afocal space).

Figure 3A:
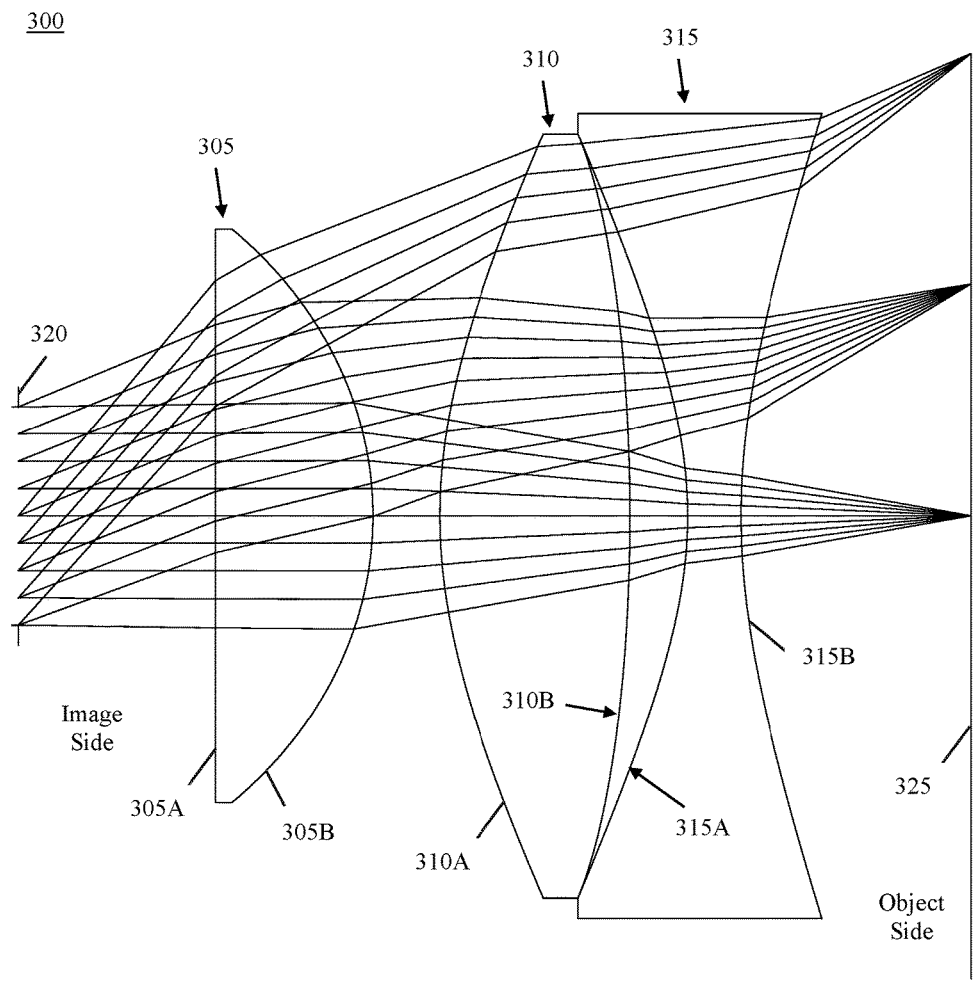
FIG. 3A illustrates another example optical system.

FIG. 3A illustrates another example optical system 300. The weight of optical system 300 is approximately 7% less than the weight of optical system 100. Optical system 300 provides increased eye relief compared to optical system 100, albeit with somewhat reduced performance as to field curvature. Optical system 300 also provides less robust color correction than optical system 100. Optical system 300 includes a first lens 305, a second lens 310, and a third lens 315. Each of lenses 305, 310, and 315 has an image side surface labeled "A" and an object side surface labeled "B." Surface 320 represents the location or position of the eye box. Surface 325 represents the surface of one or more screens. In one aspect, one or more screens are integrated into a VR headset. In that case, for example, the screen(s) are not removable. In another aspect, the screen is part of a display device that may be used with the VR headset. In this latter example, the display device is removable from the VR headset. Appreciably, the display device may include one or more screens. Optical system 300 provides an optical path formed by lenses 305, 310, and 315.

In the example of FIG. 3A, lens 305 is the lens that is the most proximal lens of optical system 300 to the placement of the user's eye. Lens 305 can be implemented as a positive lens. In the example of FIG. 3A, lens 305 has a flat surface 305A and a convex surface 305B. In another embodiment, lens 305 is implemented as a positive meniscus lens.

Lens 310 is disposed between lens 305 and lens 315 in the optical path. Lens 310 may be implemented as a positive lens. Surface 305A and surface 305B are implemented as convex surfaces. Lens 310 further may be implemented as a positive aspheric lens.

Lens 315 is the most distal lens from the placement of the user's eye. As such, lens 315 is on the object side of the optical path and is the lens of optical system 300 that is most proximal to the object side. Lens 315 is implemented as a negative lens.

Optical system 300 is capable of providing a DFOV of ±50.5° (101°) and ±33.9 mm (67.8 mm) maximum screen object size. In one or more embodiments, optical system 300 may be used within a VR headset that is adapted to include one or more screens or receive a display device having a screen. In one example, the display device includes a single screen implemented as an LCD/OLED screen used as a stereoscopic display. Examples of a display device may include, but are not limited to, a cell phone, a mobile phone, a portable computing device, a mobile device, etc. Optical system 300 may be scaled larger (or smaller) thereby resulting in a scaling of the screen image size larger (or smaller). Optical system 300 is capable of providing an eye relief of 14.5 mm and an eye box diameter of 16 mm for the user pupil.

Table 7 below provides an example of an optical prescription for optical system 300.

TABLE 7

| Description | Surface Type | Radius [mm] | Thickness [mm] | Semi-Diameter [mm] | Conic |
|---|---|---|---|---|---|
| 0 | — | Standard | Infinity | Infinity | Infinity | 0.0000 |
| 1 | Eye pupil (surface 320) | Standard | Infinity | 11.5000 | 8.0000 | 0.0000 |
| 2 | Lens 305, surface 305A | Standard | Infinity | 4.8917 | 19.5000 | 0.0000 |
| 3 | Lens 305, surface 305B | Standard | −25.3756 | 13.9292 | 21.0000 | −0.2356 |
| 4 | Lens 310, surface 310A | Standard | 38.1042 | 14.1100 | 28.0000 | −4.5456 |
| 5 | Lens 310, surface 310B | Standard | −139.2472 | 4.2182 | 28.0000 | 17.9815 |
| 6 | Lens 315, surface 315A | Standard | −31.2416 | 3.9000 | 28.0000 | −5.4046 |
| 7 | Lens 315, surface 315B | Standard | 48.7538 | 16.8420 | 29.5000 | −9.1969 |
| 8 | Screen (surface 325) | Standard | Infinity | — | 35.0000 | 0.0000 |

Table 8 illustrates a variety of additional characteristics of optical system 300. For example, Table 8 shows the overall focal length of optical system 300 (f); the focal length of each of lenses 305, 310, and 315 (f-305, f-310, f-315); the refractive index of each of lenses 305, 310, and 315 (n-305, n-310, and n-315); and the Abbe number of each of lenses 305, 310, and 315 (Vd-305, Vd-310, and Vd-315).

TABLE 8

| | |
|---|---|
| f | 45.7 mm |
| f-305 (corresponding to f1) | 47.4 mm |
| f-310 (corresponding to f2) | 57.4 mm |
| f-315 (corresponding to f3) | −28.8 mm |
| n-305 | 1.534 |
| n-310 | 1.534 |
| n-315 | 1.642 |
| Vd-305 (corresponding to Vd1) | 56.23 |
| Vd-310 (corresponding to Vd2) | 56.23 |
| Vd-315 (corresponding to Vd3) | 22.41 |

In another aspect, optical system 300 may use a variety of different lens materials to implement lenses 305, 310, and 315. In one example, each of lenses 305, 310, and 315 is implemented using a same material, e.g., optical plastic or optical glass. In another example, two of lenses 305, 310, and 315 are implemented using optical plastic (optical glass), while the other one of lenses 305, 310, and 315 is implemented using optical glass (optical plastic). It should be appreciated that the particular optical plastic and/or particular optical glass used may differ between lenses.

In one or more embodiments, one or more or all of lenses 305, 310, and 315 may be implemented using an optical plastic. In an example embodiment, lens 305 is implemented using COC; lens 310 is implemented using COC; and lens 315 is implemented using OKP-1. In this example, the weight of optical system 300 is approximately 70 grams.

An optical system 300 as described in connection with FIG. 3A may be implemented to satisfy the expressions illustrated in Table 9 to provide improved optical performance.

TABLE 9

| Expressions | Value |
|---|---|
| OAL [mm] | 55.28 |
| BFL [mm] | 16.84 |
| D1 [mm] | 4.89 |
| D2 [mm] | 4.22 |
| f1/f | 1.04 |
| f2/f | 1.26 |
| f3/f | −0.63 |
| f1/f2 | 0.82 |
| f2/f3 | −1.99 |
| V2-V3 | 33.82 |
| OAL/f | 1.21 |

TABLE 9-continued

| Expressions | Value |
|---|---|
| BFL/f | 0.37 |
| r2/f | −0.56 |
| r3/f | 0.83 |
| r4/f | −3.05 |
| r5/f | −0.68 |
| D1/f | 0.11 |
| D2/f | 0.09 |

Figure 3B:
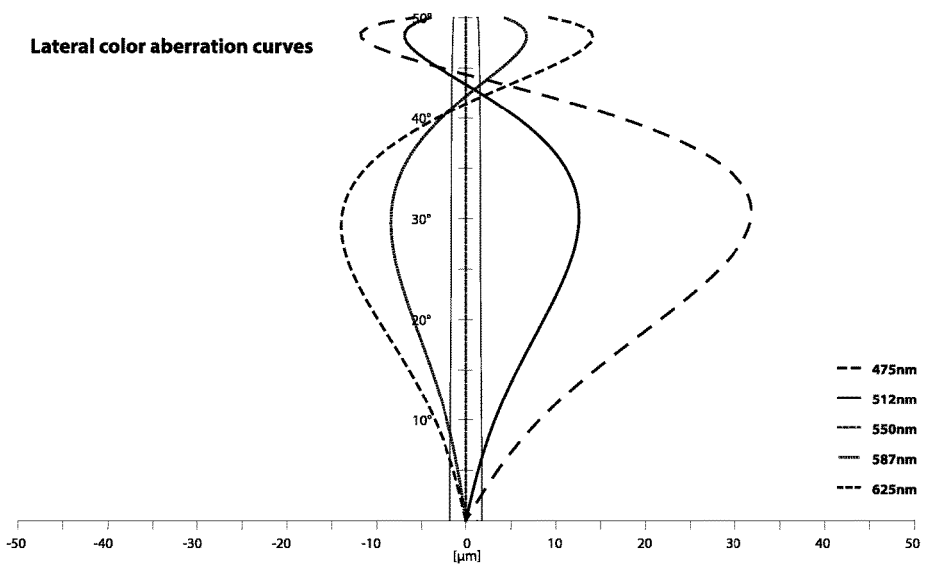
FIG. 3B illustrates lateral color aberration for the optical system of FIG. 3A on the screen side in micrometers.
Figure 3C:
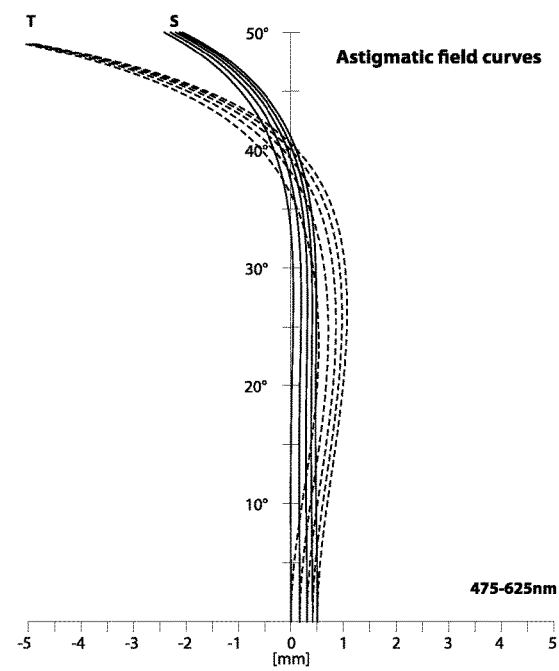
FIG. 3C illustrates field curvature and astigmatism aberrations for the optical system of FIG. 3A on the screen side in millimeters.
Figure 3D:
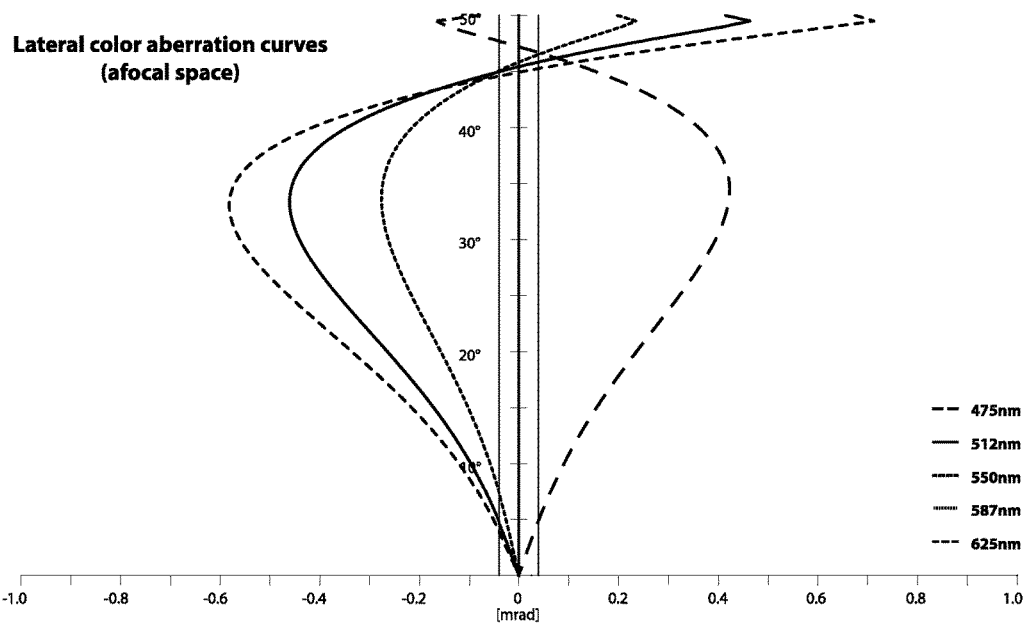
FIG. 3D illustrates lateral color aberration for the optical system of FIG. 3A on the image side in milliradians (afocal space).
Figure 3E:
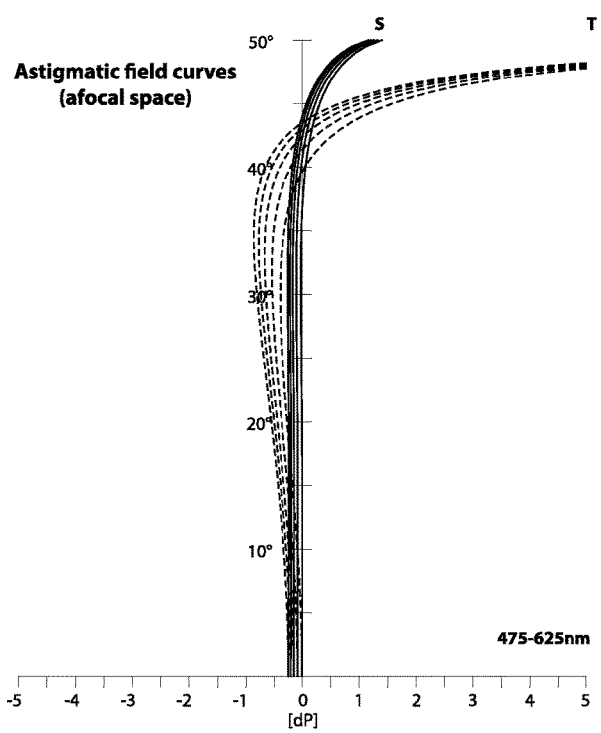
FIG. 3E illustrates field curvature and astigmatism for the optical system of FIG. 3A on the image side in diopter units (afocal space).

FIG. 3B illustrates lateral color aberration for optical system 300 of FIG. 3A on the screen side in micrometers. FIG. 3C illustrates field curvature and astigmatism aberrations for optical system 300 of FIG. 3A on the screen side in millimeters. FIG. 3D illustrates lateral color aberration for optical system 300 of FIG. 3A on the image side in milliradians (afocal space). FIG. 3E illustrates field curvature and astigmatism for optical system 300 of FIG. 3A on the image side in diopter units (afocal space).

Figure 4A:
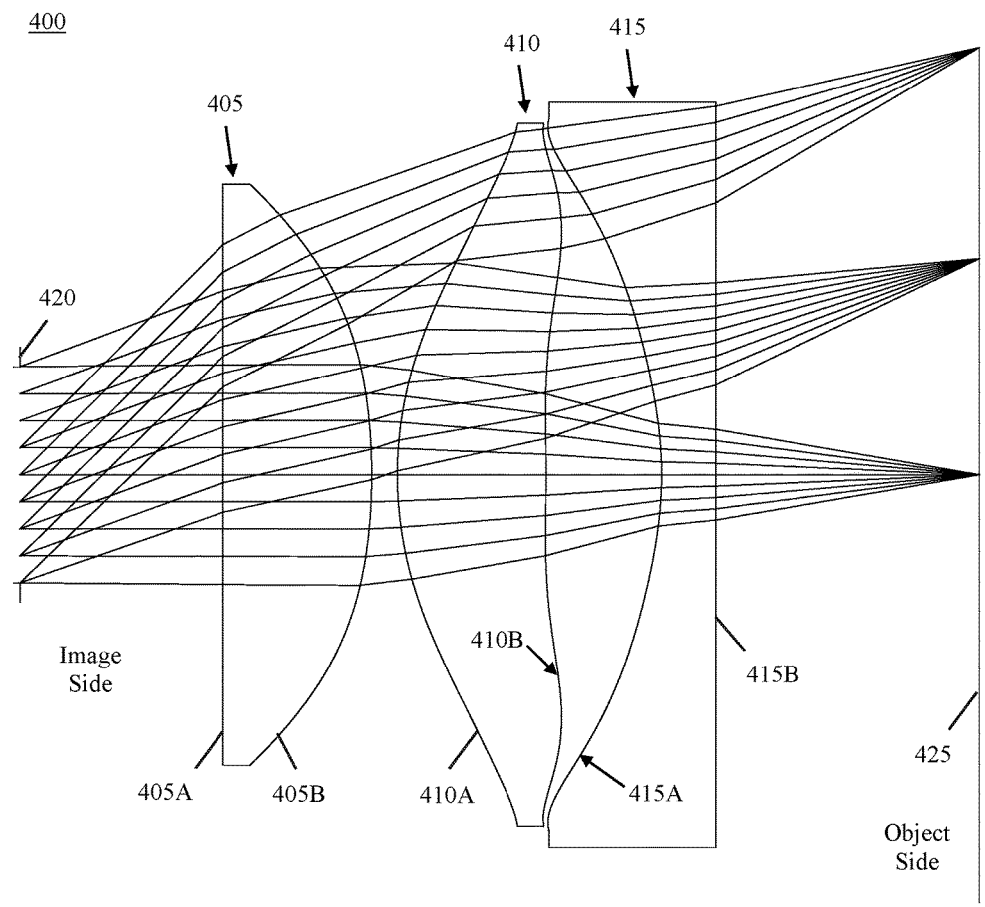
FIG. 4A illustrates another example optical system.

FIG. 4A illustrates another example optical system 400. Optical system 400 has a weight that is approximately 30% less than the weight of optical system 100. Optical system 400 also has a FOV that is approximately 10% narrower than the FOV of optical system 100. Optical system 400 provides somewhat reduced optical performance as to field curvature than optical system 100.

Optical system 400 includes a first lens 405, a second lens 410, and a third lens 415. Each of lenses 405, 410, and 415 has an image side surface labeled "A" and an object side surface labeled "B." Surface 420 represents a location or position of the eye box. Surface 425 represents the surface of one or more screens. In one aspect, one or more screens are integrated into a VR headset. In that case, for example, the screen(s) are not removable. In another aspect, the screen is part of a display device that may be used with the VR headset. In this latter example, the display device is removable from the VR headset. Appreciably, a display device may include one or more screens. Optical system 400 provides an optical path formed by lenses 405, 410, and 415.

In the example of FIG. 4A, lens 405 is the lens that is the most proximal lens of optical system 400 to the placement of the user's eye. Lens 405 can be implemented as a positive lens. In the example of FIG. 4A, lens 405 has a flat surface 405A and a convex surface 405B. In another embodiment, lens 405 is implemented as a positive meniscus lens.

Lens 410 is disposed between lens 405 and lens 415 in the optical path. Lens 410 may be implemented as a positive lens. In an aspect, lens 410 may be implemented as a positive aspheric lens.

Lens 415 is the most distal lens from the placement of the user's eye. As such, lens 415 is on the object side of the optical path and is the lens of optical system 400 that is most proximal to the object side. Lens 415 can be implemented as a negative lens.

Optical system 400 is capable of providing a DFOV of ±45° (90°) and ±31.7 mm (63.4 mm) maximum screen object size. In one or more embodiments, optical system 400 may be used within a VR headset that is adapted to include one or more screens or receive a display device having a screen. In one example, the display device includes a screen implemented as an LCD/OLED screen used as a stereoscopic display. Examples of a display device may include, but are not limited to, a cell phone, a mobile phone, a portable computing device, a mobile device, etc. Optical system 400 may be scaled larger (or smaller) thereby resulting in a scaling of the screen image size larger (or smaller). Optical system 400 is capable of providing eye relief of 15 mm and an eye box diameter of 16 mm for the user pupil. Eye relief of 15 mm allows a VR headset using optical system 400 for each eyepiece to be used with eyeglasses and/or spectacles.

Table 10 below provides an example of an optical prescription for optical system 400.

TABLE 11

| f | 46.3 mm |
|---|---|
| f-405 (corresponding to f1) | 84.4 mm |
| f-410 (corresponding to f2) | 46.6 mm |
| f-415 (corresponding to f3) | −43.8 mm |
| n-405 | 1.534 |
| n-410 | 1.534 |
| n-415 | 1.642 |
| Vd-405 (corresponding to Vd1) | 56.23 |
| Vd-410 (corresponding to Vd2) | 56.23 |
| Vd-415 (corresponding to Vd3) | 22.41 |

Optical system 400 may use a variety of different lens materials to implement lenses 405, 410, and 415. In one example, each of lenses 405, 410, and 415 is implemented using a same material, e.g., optical plastic or optical glass. In another example, two of lenses 405, 410, and 415 are implemented using optical plastic (optical glass), while the other one of lenses 405, 410, and 415 is implemented using optical glass (optical plastic). It should be appreciated that the particular optical plastic and/or particular optical glass used may differ between lenses.

In one or more embodiments, one or more or all of lenses 405, 410, and 415 may be implemented using an optical plastic. In an example embodiment, lens 405 is implemented using COC; lens 410 is implemented using COC; and lens 415 is implemented using OKP-1. In this example, the weight of optical system 400 is approximately 50 grams.

An optical system 400 as described in connection with FIG. 4A may be implemented to satisfy the expressions illustrated in Table 12 to provide improved optical performance.

TABLE 10

| Description | Surface Type | Radius [mm] | Thickness [mm] | Semi-Diameter [mm] | Conic | $4^{th}$ order | $6^{th}$ order | $8^{th}$ order | $10^{th}$ order | $12^{th}$ order |
|---|---|---|---|---|---|---|---|---|---|---|
| 0 | — | Standard | Infinity | Infinity | Infinity | 0.000 | — | — | — | — | — |
| 1 | Eye pupil (surface 420) | Standard | Infinity | 15.000 | 8.000 | 0.000 | — | — | — | — | — |
| 2 | Lens 405, surface 405A | Standard | Infinity | 11.0014 | 20.5865 | 0.000 | — | — | — | — | — |
| 3 | Lens 405, surface 405B | Even Asphere | −45.203 | 1.8997 | 21.5143 | 0.000 | −2.317 × $10^{-5}$ | 9.936 × $10^{-9}$ | −1.548 × $10^{-11}$ | 1.173 × $10^{-13}$ | −1.372 × $10^{-16}$ |
| 4 | Lens 410, surface 410A | Even Asphere | 28.295 | 11.0019 | 26.0298 | 0.000 | 1.634 × $10^{-6}$ | −3.179 × $10^{-8}$ | −6.217 × $10^{-11}$ | 2.186 × $10^{-13}$ | −1.785 × $10^{-16}$ |
| 5 | Lens 410, surface 410B | Even Asphere | −182.29 | 8.5425 | 26.3192 | 0.000 | 7.274 × $10^{-5}$ | −2.591 × $10^{-7}$ | 3.815 × $10^{-10}$ | −3.269 × $10^{-13}$ | 1.572 × $10^{-16}$ |
| 6 | Lens 415, surface 415A | Even Asphere | −28.359 | 3.9971 | 26.4703 | 0.000 | 4.716 × $10^{-5}$ | −1.626 × $10^{-7}$ | 3.415 × $10^{-10}$ | −4.062 × $10^{-13}$ | 2.446 × $10^{-16}$ |
| 7 | Lens 415, surface 415B | Standard | Infinity | 19.5000 | 27.6000 | 0.000 | — | — | — | — | — |
| 8 | Screen (surface 425) | Standard | Infinity | — | 33.0000 | 0.000 | — | — | — | — | — |

Table 11 illustrates a variety of additional characteristics of optical system 400. For example, Table 11 shows the overall focal length of optical system 400 (f); the focal length of each of lenses 405, 410, and 415 (f-405, f-410, f-415); the refractive index of each of lenses 405, 410, and 415 (n-405, n-410, and n-415); and the Abbe number of each of lenses 405, 410, and 415 (Vd-405, Vd-410, and Vd-415).

TABLE 12

| Expression | Value |
|---|---|
| OAL [mm] | 55.93 |
| BFL [mm] | 19.50 |
| D1 [mm] | 1.90 |
| D2 [mm] | 8.54 |
| f1/f | 1.82 |
| f2/f | 1.00 |

TABLE 12-continued

| Expression | Value |
|---|---|
| f3/f | −0.95 |
| f1/f2 | 1.81 |
| f2/f3 | −1.06 |
| V2-V3 | 33.82 |
| OAL/f | 1.21 |
| BFL/f | 0.42 |
| r2/f | −0.98 |
| r3/f | 0.61 |
| r4/f | −3.94 |
| r5/f | −0.61 |
| D1/f | 0.04 |
| D2/f | 0.18 |

Figure 4B:
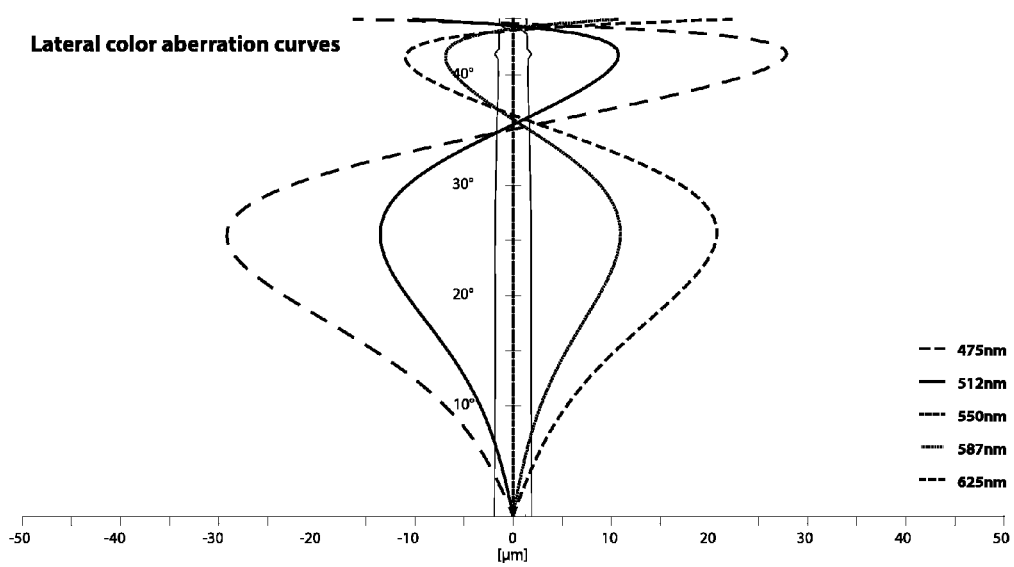
FIG. 4B illustrates lateral color aberration for the optical system of FIG. 4A on the screen side in micrometers.
Figure 4C:
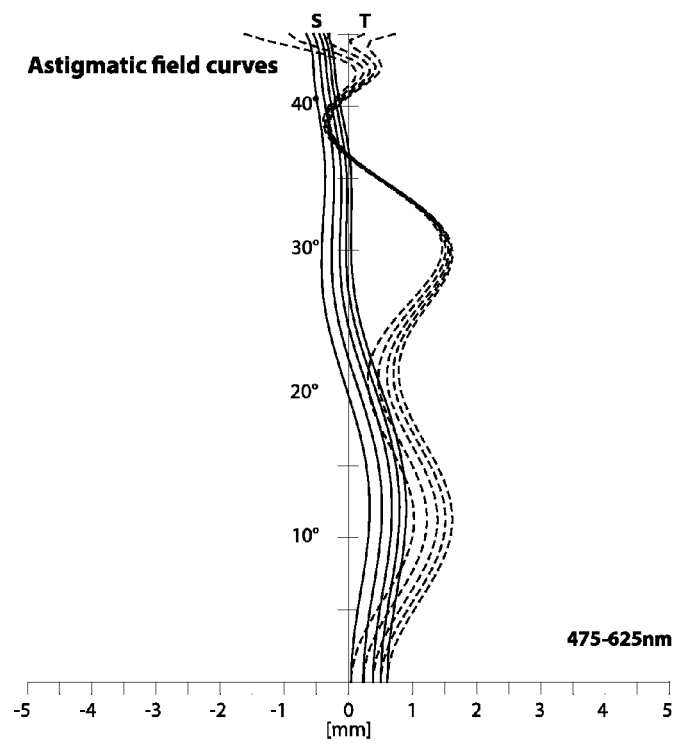
FIG. 4C illustrates field curvature and astigmatism aberrations for the optical system of FIG. 4A on the screen side in millimeters.
Figure 4D:
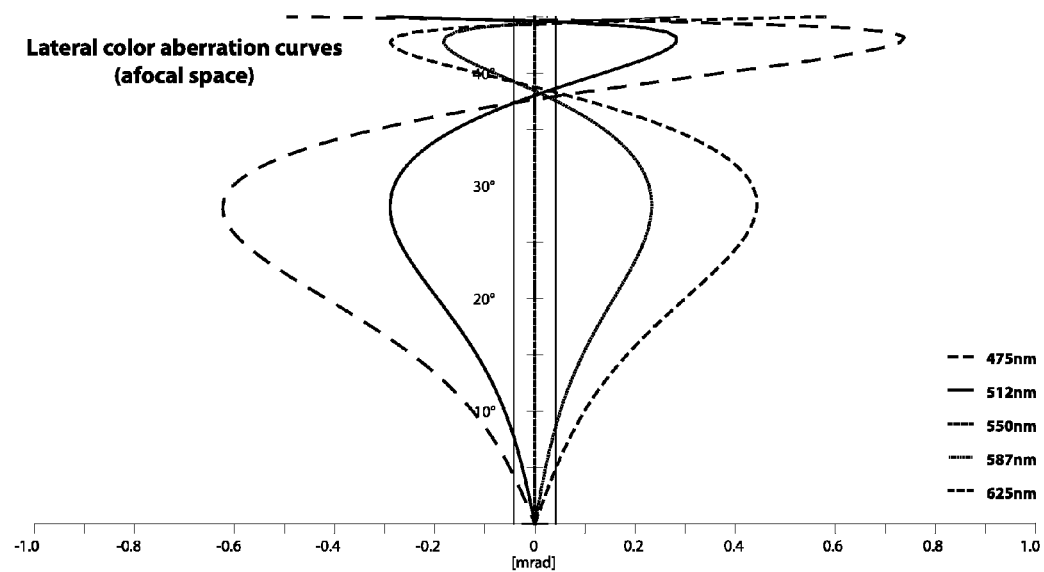
FIG. 4D illustrates lateral color aberration for the optical system of FIG. 4A on the image side in milliradians (afocal space).
Figure 4E:
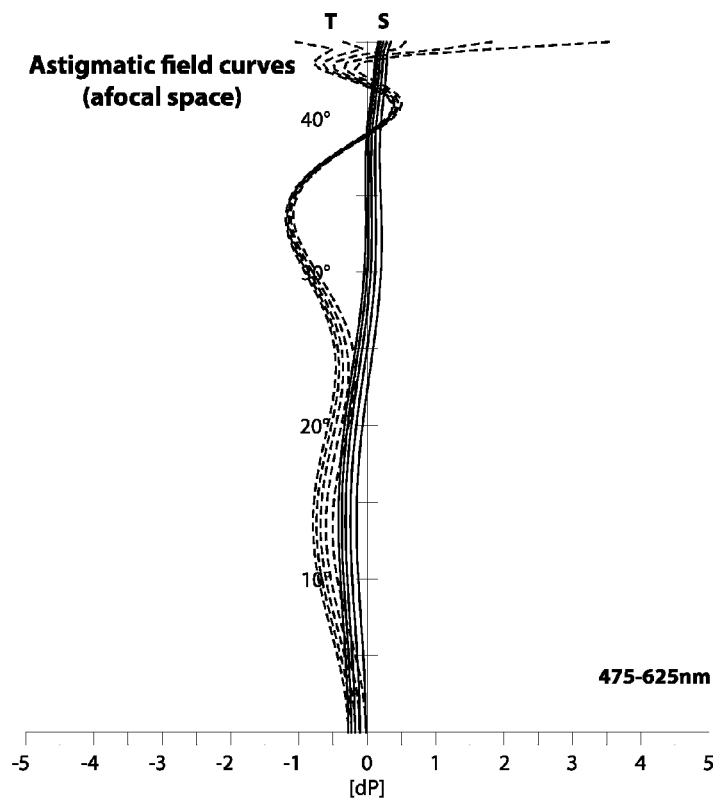
FIG. 4E illustrates field curvature and astigmatism for the optical system of FIG. 4A on the image side in diopter units (afocal space).

FIG. 4B illustrates lateral color aberration for optical system 400 of FIG. 4A on the screen side in micrometers. FIG. 4C illustrates field curvature and astigmatism aberrations for optical system 400 of FIG. 4A on the screen side in millimeters. FIG. 4D illustrates lateral color aberration for optical system 400 of FIG. 4A on the image side in milli-radians (afocal space). FIG. 4E illustrates field curvature and astigmatism for optical system 400 of FIG. 4A on the image side in diopter units (afocal space).

Figure 5A:
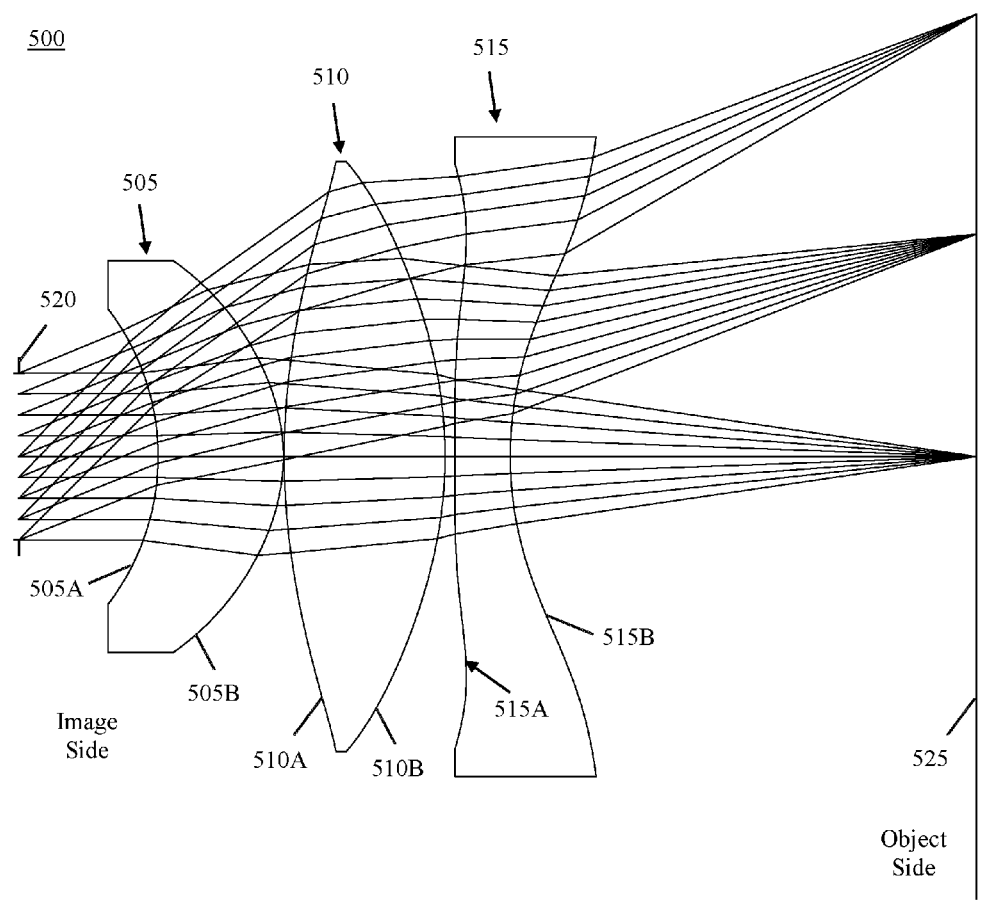
FIG. 5A illustrates another example optical system.

FIG. 5A illustrates an example optical system 500. Optical system 500 has a weight that is approximately 60% less than the weight of optical system 100. Optical system 500 also has a FOV that is approximately 10% narrower than the FOV of optical system 100. Optical system 500 has a 25% smaller eye box size than optical system 100. Further, optical system 500 provides reduced optical performance compared to optical system 100 of FIG. 1 as to field curvature with introduced zonal astigmatism.

Optical system 500 includes a first lens 505, a second lens 510, and a third lens 515. Each of lenses 505, 510, and 515 has an image side surface labeled "A" and an object side surface labeled "B." Surface 520 represents a location or position of the eye box. Surface 525 represents a surface of one or more screens. In one aspect, one or more screens are integrated into a VR headset. In that case, for example, the screen(s) are not removable. In another aspect, the screen is part of a display device that may be used with the VR headset. In this latter example, the display device is removable from the VR headset. Appreciably, a display device may include one or more screens. Optical system 500 provides an optical path formed by lenses 505, 510, and 515.

In the example of FIG. 5A, lens 505 is the lens that is the most proximal lens of optical system 500 to the placement of the user's eye. Lens 505 can have positive refractive power. In an embodiment, lens 505 may be a positive meniscus lens.

Lens 510 is disposed between lens 505 and lens 515 in the optical path. Lens 510 may be implemented with positive refractive power. In an embodiment, lens 510 may be implemented as a positive biconvex lens.

Lens 515 is the most distal lens from the placement of the user's eye. As such, lens 515 is on the object side of the optical path and is the lens of optical system 500 that is most proximal to the object side. Lens 515 is implemented with negative refractive power. In an embodiment, lens 515 is implemented as a negative meniscus lens. Lens 515 can also have a center portion that has a negative meniscus shape and an outer portion that has a different shape.

Optical system 500 is capable of providing a DFOV of ±45° (90°) and ±31.3 mm (62.6 mm) maximum screen object size. In one or more embodiments, optical system 500 may be used within a VR headset that is adapted to include one or more screens or receive a display device having a screen. In one example, the display device includes a single screen implemented as an LCD/OLED screen used as a stereoscopic display. Examples of a display device may include, but are not limited to, a cell phone, a mobile phone, a portable computing device, a mobile device, etc. Optical system 500 may be scaled larger (or smaller) thereby resulting in a scaling of the screen image size larger (or smaller). Optical system 500 is capable of providing an eye relief of 10 mm and an eye box diameter of 12 mm for the user pupil. Eye relief of 12 mm allows a VR headset using optical system 500 for each eyepiece to be used with eyeglasses and/or spectacles.

Table 13 provides an example of an optical prescription for optical system 500.

TABLE 13

| | Description | Surface Type | Radius [mm] | Thickness [mm] | Semi-Diameter [mm] | Conic | $4^{th}$ order | $6^{th}$ order | $8^{th}$ order | $10^{th}$ order | $12^{th}$ order |
|---|---|---|---|---|---|---|---|---|---|---|---|
| 0 | — | Standard | Infinity | Infinity | Infinity | 0.000 | — | — | — | — | — |
| 1 | Eye pupil (surface 520) | Standard | Infinity | 10.000 | 6.000 | 0.000 | — | — | — | — | — |
| 2 | Lens 505, surface 505A | Standard | −17.454 | 8.995 | 10.623 | 0.000 | — | — | — | — | — |
| 3 | Lens 505, surface 505B | Even Asphere | −13.499 | 0.066 | 14.087 | −0.867 | $-1.880 \times 10^{-5}$ | $2.375 \times 10^{-8}$ | $-1.362 \times 10^{-9}$ | $2.965 \times 10^{-12}$ | — |
| 4 | Lens 510, surface 510A | Even Asphere | 48.624 | 11.562 | 21.200 | 0.000 | $-7.322 \times 10^{-6}$ | $9.957 \times 10^{-9}$ | $6.896 \times 10^{-13}$ | $-3.276 \times 10^{-14}$ | — |
| 5 | Lens 510, surface 510B | Even Asphere | −30.989 | 0.709 | 21.200 | 0.000 | $8.203 \times 10^{-6}$ | $1.206 \times 10^{-8}$ | $-4.122 \times 10^{-11}$ | $1.221 \times 10^{-14}$ | — |
| 6 | Lens 515, surface 515A | Even Asphere | −590.05 | 3.978 | 21.000 | 0.000 | $6.309 \times 10^{-5}$ | $-2.679 \times 10^{-7}$ | $3.781 \times 10^{-10}$ | $-2.386 \times 10^{-13}$ | $1.046 \times 10^{-16}$ |
| 7 | Lens 515, surface 515B | Even Asphere | 26.117 | 33.5000 | 23.000 | 0.000 | $1.818 \times 10^{-5}$ | $-1.995 \times 10^{-7}$ | $3.092 \times 10^{-10}$ | $-1.410 \times 10^{-13}$ | $-6.816 \times 10^{-17}$ |
| 8 | Screen (surface 525) | Standard | Infinity | — | 33.0000 | 0.000 | — | — | — | — | — |

Table 14 illustrates a variety of additional characteristics of optical system 500. For example, Table 14 shows the overall focal length of optical system 500 (f); the focal length of each of lenses 505, 510, and 515 (f-505, f-510, f-515); the refractive index of each of lenses 505, 510, and 515 (n-505, n-510, and n-515); and the Abbe number of each of lenses 505, 510, and 515 (Vd-505, Vd-510, and Vd-515).

TABLE 14

| | |
|---|---|
| f | 41 mm |
| f-505 (corresponding to f1) | 62.0 mm |
| f-510 (corresponding to f2) | 37.2 mm |
| f-515 (corresponding to f3) | −38.5 mm |
| n-505 | 1.534 |
| n-510 | 1.534 |
| n-515 | 1.642 |
| Vd-505 (corresponding to Vd1) | 56.23 |
| Vd-510 (corresponding to Vd2) | 56.23 |
| Vd-515 (corresponding to Vd3) | 22.41 |

Optical system 500 may use a variety of different lens materials to implement lenses 505, 510, and 515. In one example, each of lenses 505, 510, and 515 may be implemented using a same material, e.g., optical plastic or optical glass. In another example, two of lenses 505, 510, and 515 are implemented using optical plastic (optical glass), while the other one of lenses 505, 510, and 515 is implemented using optical glass (optical plastic). It should be appreciated that the particular optical plastic and/or particular optical glass used may differ between lenses.

In one or more embodiments, one or more or all of lenses 505, 510, and 515 are implemented using an optical plastic. In an example embodiment, lens 505 is implemented using Cyclic olefin copolymer (COC); lens 510 is implemented using COC; and lens 515 is implemented using OKP-1. In this example, the weight of optical system 500 is approximately 29 grams.

An optical system 500 as described in connection with FIG. 5 may be implemented to satisfy the expressions illustrated in Table 15 to provide improved optical performance.

TABLE 15

| Expression | Value |
|---|---|
| OAL [mm] | 58.81 |
| BFL [mm] | 33.50 |
| D1 [mm] | 0.07 |
| D2 [mm] | 0.71 |
| f1/f | 1.51 |
| f2/f | 0.91 |
| f3/f | −0.94 |
| f1/f2 | 1.67 |
| f2/f3 | −0.97 |
| V2-V3 | 33.82 |
| OAL/f | 1.43 |
| BFL/f | 0.82 |
| r2/f | −0.33 |
| r3/f | 1.19 |
| r4/f | −0.76 |
| r5/f | −14.4 |
| D1/f | 0.00 |
| D2/f | 0.02 |

Figure 5B:
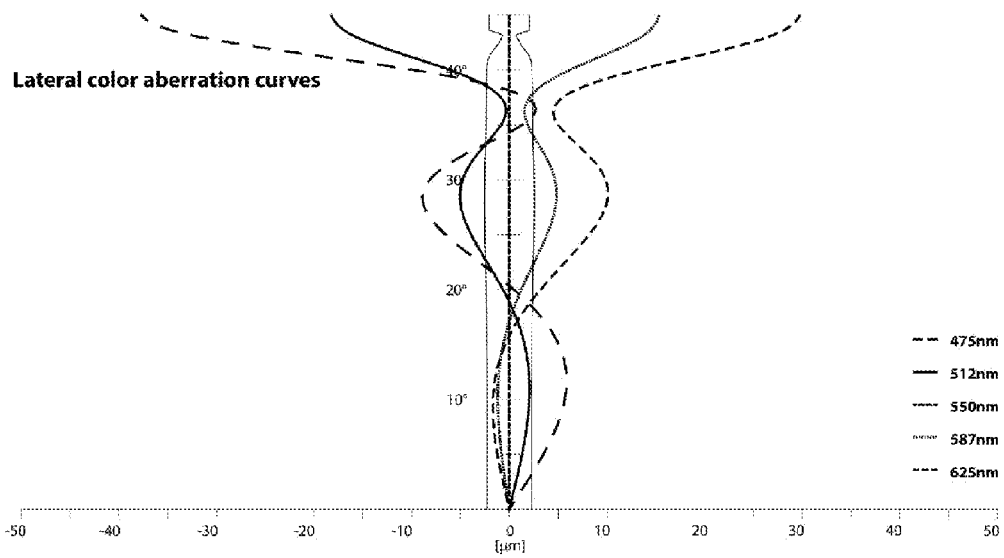
FIG. 5B illustrates lateral color aberration for the optical system of FIG. 5A on the screen side in micrometers.
Figure 5C:
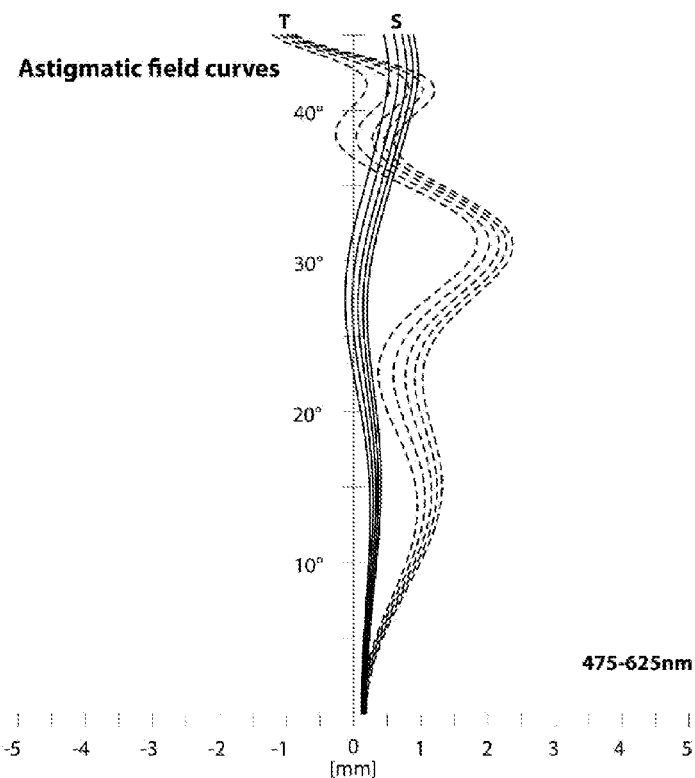
FIG. 5C illustrates field curvature and astigmatism aberrations for the optical system of FIG. 5A on the screen side in millimeters.
Figure 5D:
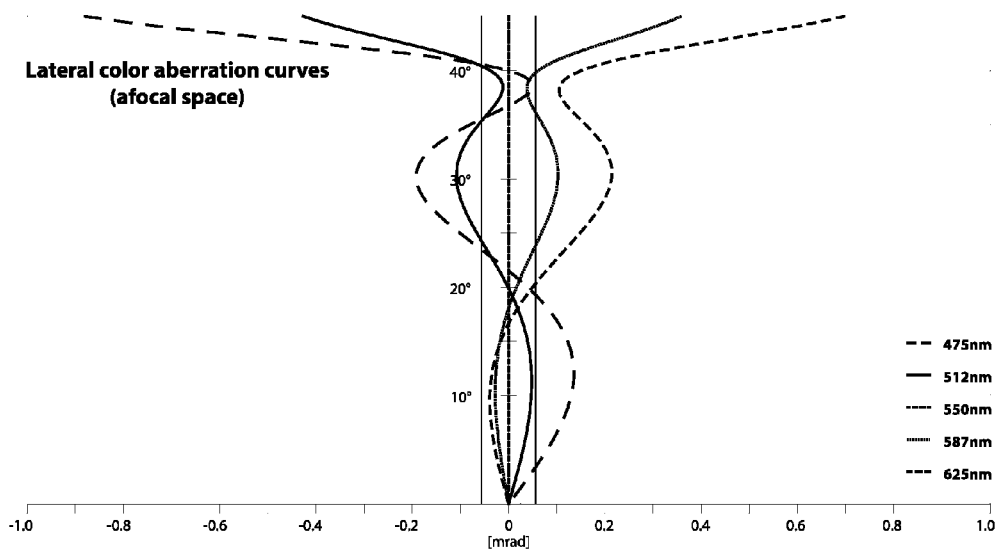
FIG. 5D illustrates lateral color aberration for the optical system of FIG. 5A on the image side in milliradians (afocal space).
Figure 5E:
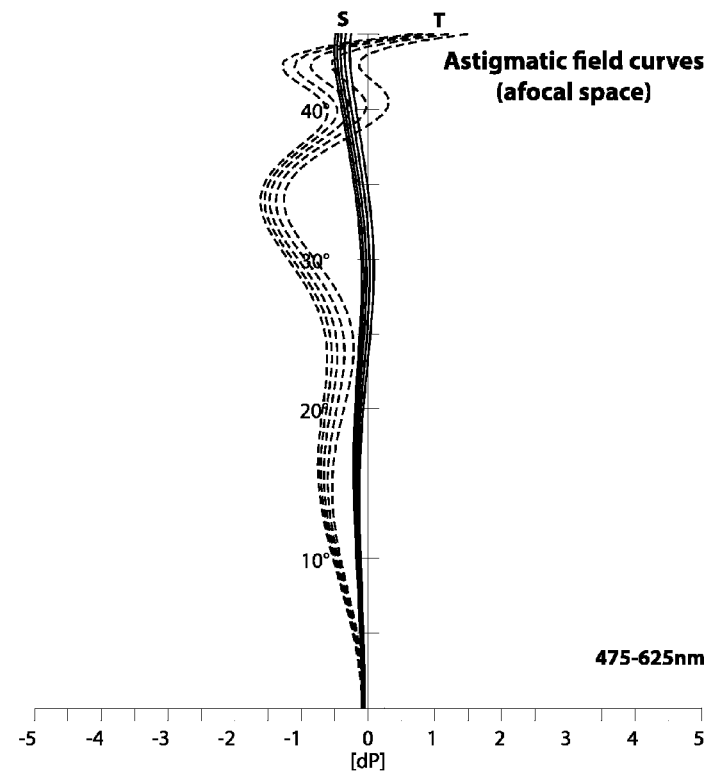
FIG. 5E illustrates field curvature and astigmatism for the optical system of FIG. 5A on the image side in diopter units (afocal space).

FIG. 5B illustrates lateral color aberration for optical system 500 of FIG. 5A on the screen side in micrometers. FIG. 5C illustrates field curvature and astigmatism aberrations for optical system 500 of FIG. 5A on the screen side in millimeters. FIG. 5D illustrates lateral color aberration for optical system 500 of FIG. 5A on the image side in milliradians (afocal space). FIG. 5E illustrates field curvature and astigmatism for optical system 500 of FIG. 5A on the image side in diopter units (afocal space).

The example optical systems disclosed herein are capable of providing correction of astigmatism and field curvature resulting in total field curvature within ±1 diopter (dP) range across 90% of the full field view. Distortion may remain at approximately 35-40% at the edge of the field, but may be corrected in software using a distortion transformation of the opposite sign. The example optical systems further are capable of providing improved longitudinal spherical aberration correction across the pupil with less color aberration. For example, lateral color of the example optical systems is corrected to less than one (1) milliradian (which can correspond to a single pixel on 518 ppi display observed through a 35 mm focal length VR set).

The focus of the example optical systems described herein may be adjusted to compensate for the optical prescription of an individual user eye (e.g., single vision SPHERE factor, to correct for myopia or hyperopia, while astigmatism/CYLINDER prescription may not be not corrected). Compensation for optical prescription of a user may be accomplished by moving the optical system, for each eye, away or toward the screen(s) to achieve the best focus for the user's eye while keeping optical aberrations under control. In one aspect, the optical system for each eye may be moved independently of the other.

The examples described herein exhibit variation in lens size/thickness, relative separation between lenses, and/or distance to the screen(s). Increased size of the lenses and movement of the lenses closer to the screen(s) usually provides better performance, but at the cost of increased weight. The example optical systems disclosed herein provide a balance with three optical lenses and a weight ranging from less than approximately 30 grams to an upper threshold of approximately 74.9 grams when using optical plastics as described.

It should be appreciated that the particular materials described herein for implementing lenses are provided for purposes of example only. Other suitable optical plastics may be used. For purposes of illustration, for the optical system embodiments described herein, example substitutes for OKP-1 may include, but are not limited to, OKP4, OKP4HT, Polystyrene, and Polycarbonate. Other suitable substitutes for OKP-1 may include flint type materials with a low Abbe number around 30. Example substitutes for COC within the optical system embodiments described herein can include, but are not limited to, polymethyl methacrylate (PMMA), acrylic, 330R, 480R, and Zeonex E48R. Other suitable substitutes for COC may include crown type materials having an index of refraction around 1.5 and an Abbe number close to 56. For example, in the various example optical systems described herein, the first two lenses are crowns, while the third lens is flint. Embodiments utilizing plastics as described may be manufactured using injection molding techniques.

In alternative example embodiments, one or more or each of the lenses may be implemented as an equivalent or substantially equivalent Fresnel lens.

In one or more embodiments, the lenses implemented within each of the example optical systems described herein may be implemented to include a flange. The flange, for example, may aid in mounting the lenses within a suitable housing.

In one or more embodiments, the lenses included in the optical systems described herein may be cropped. For example, the lenses may be cropped, e.g., trimmed, along the edge of each of the lenses that is close, or closest, to the user's nose when the optical systems are positioned within a VR headset. By cropping the lenses, additional room for the user's nose is provided when the optical systems are incorporated into the VR headset. Thus, the cropped lenses are no longer round or cylindrical across the perimeter. It should be appreciated that cropping the lenses as described to better accommodate the user's nose does not have an effect upon the optical performance of the optical systems.

In one or more alternative embodiments, one or more optical windows may be added. For example, a flat window may be added at the image side, at the object side, or both of the optical systems described herein. The window(s) may be made of glass or plastic. For example, an optical window may be placed immediately to the left of the lens closest to the user's eye. An optical window may be placed immediately to the right of the lens closest to the screen(s). The optical windows provide protection for the optics. Further, optical windows may provide a surface that is easier to dust, wipe, or otherwise clean. The optical window(s) may be added without modifying the optical prescriptions and/or optical characteristics (e.g., the expressions) of the various example embodiments described.

In one or more embodiments, an optical window on the user eye side of the optical system may be added that does modify the optical characteristics of the example embodiments described herein. For example, the optical window may be fabricated to implement a user's eye prescription. The optical window, for example, may be configured to mount, e.g., snap, on or into the VR headset so that the optical window with the user's prescription is closer to the user's eye than the first lens of the optical system located on the image side. By incorporating the user's eye prescription into an optical window on the user eye side of the optical system, the user need not wear eye glasses when using the VR headset.

Figure 6:
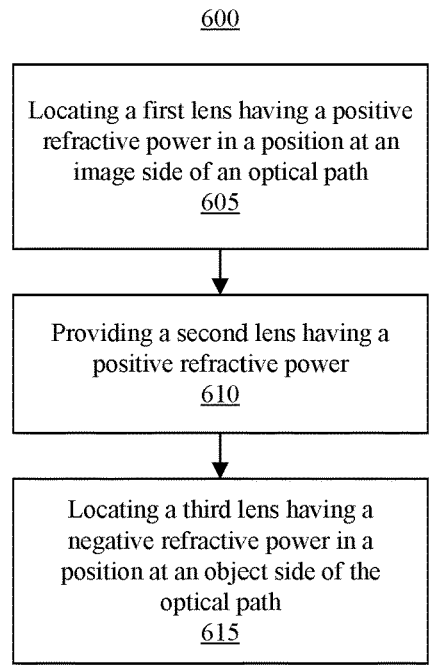
FIG. 6 illustrates an example method of implementing an optical system in accordance with the example embodiments described herein.

FIG. 6 illustrates an example method 600 of implementing an optical system in accordance with the example embodiments described herein. In one or more embodiments, method 600 may be implemented by locating the various lenses as described within a lens mounting assembly adapted to secure the lenses positioned as described. In one or more other embodiments, aspects of method 600 may be implemented using an injection molding process. For example, using an injection molding process, each of the three lenses may be fabricated and positioned as described within a mounting assembly or module. In another example, conditioned upon the ability of 3D printing technology to generate a surface finish of sufficient optical quality, the optical system may be fabricated using a 3D printing technology. In any case, lenses of the optical system may be provided as described below.

In block 605, a first lens having a positive refractive power is located at a position at an image side of an optical path. For example, the first lens may be most proximal to the image side of the optical path. In block 610, a second lens having a positive refractive power is provided. The second lens is positioned relative to the first lens. For example, the second lens may be located in a position that is adjacent to the first lens. In block 615, a third lens having a negative refractive power is located at a position at an object side of the optical path. For example, the third lens may be most proximal to the object side of the optical path. In an aspect, the second lens is located between the first lens and the third lens. Further, the first lens, the second lens, and the third lens form the optical path with the object side facing a screen and the image side adapted to provide an image from the screen to a user.

In an aspect, the lenses of the optical system may be cropped so as to better accommodate the user's nose when the optical system(s) are incorporated into a VR headset. In one aspect, the lenses may be cropped after fabrication. In another aspect, the lenses may be fabricated in the cropped shape so that post processing of the lenses, e.g., cropping of the lenses, need not be performed.

In an aspect, the optical system is configured to satisfy the expression $0.8<f1/f<2.2$ and the expression $0.8<f2/f<1.89$.

In another aspect, the optical system is configured to satisfy the expression $-1.0<f3/f<-0.4$ and the expression $0.4<f1/f2<2.0$.

In another aspect, the optical system is configured to satisfy the expression $-3.0<f2/f3<-0.8$ and the expression $|Vd2-Vd3|>24$.

In another aspect, the optical system is configured to satisfy the expression $1.0<OAL/f<1.8$ and the expression $0.0<D1/f<0.2$.

In another aspect, the optical system is configured to satisfy the expression $0.2<BFL/f<0.9$ and the expression $0.0<D2/f<0.4$.

In another aspect, the optical system is configured to satisfy the expression $-1.0<r2/f<-0.2$ and the expression $0.5<r3/f<2.5$.

In another aspect, the optical system is configured to satisfy the expression $-5.0<r4/f<-0.5$ and the expression $-20<r5/f<-0.5$.

The foregoing expressions relating to method 600 are obtained from expressions 1-14 described herein. It should be appreciated that while the examples provided herein combine certain ones of the expressions, the example embodiments described herein are provided for purposes of illustration. Optical systems as described herein may satisfy any combination of one or more (e.g., any subset of expressions 1-14) or all of expressions 1-14.

In another aspect, the optical system corrects astigmatism, field curvature, and/or lateral color. In another aspect, the optical system corrects at least one of a group of aberrations including astigmatism and field curvature; or lateral color.

In still another aspect, the optical system may be provided as an eyepiece included in a VR head-mountable assembly, wherein the head-mountable assembly includes one or more screens or is adapted to receive a display device having one or more screens. The eyepiece may be integrated, e.g., not removable, with the VR head-mount assembly. In another aspect, the eyepiece(s) may be provided as part of a removable lens module. As discussed, the display device may be a mobile phone.

Figure 7:
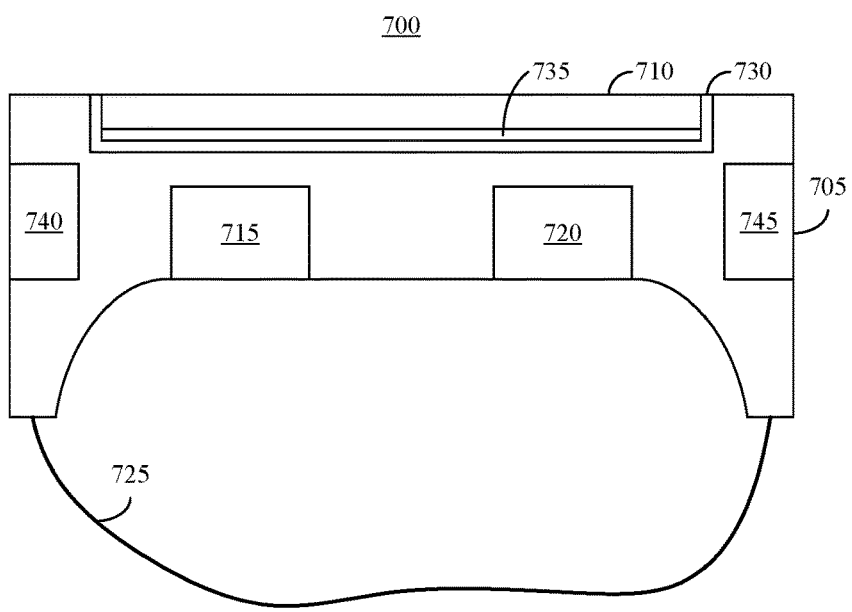
FIG. 7 illustrates an example of a head-mountable assembly for virtual reality.

FIG. 7 is an example VR headset 700. VR Headset 700 is adapted to be worn by a user and is an example of a head-mountable assembly. VR Headset 700 may include a frame 705. A strap 725 may be coupled to frame 705. A user may wear VR headset 700 so that the user's eyes gaze through eyepieces 715 and 720 toward display device 710.

In one aspect, frame 705 is adapted to include a display mount 730. Display mount 730 is configured to receive display device 710. Display mount 730 may be shaped to cooperatively engage display device 710. Further, display mount 730 may include one or more fastening or locking mechanisms adapted to secure display device 710 in place. For example, display mount 730 may include latches, straps, etc. Though not shown, frame 705 may include a door or hatch that may be closed to cover the exterior surface (back side opposite the screen side) of display device 710 so that display device 710 is secured inside of frame 705 once mounted in display mount 730.

In another aspect, display device 710 may be implemented as any of a variety of devices that include a screen 735. Example implementations of display device 710 include, but are not limited to, a cell phone, a mobile phone, a portable computing and/or communication device, stand-alone screens, etc. Screen 735 capable of stereoscopic operation. In one example, screen 735 may be implemented as an LCD screen. In another example, screen 735 may be implemented as an OLED screen. Further, in another example, screen 735 may be configured to display images up to and including the various sizes described herein depending upon the particular optical system utilized and/or any scaling of such system that may be implemented. Screen 735 faces eyepieces 715 and 720 so that a user looking through eyepieces 715 and 720 may view images displayed upon screen 735. As discussed, in one or more embodiments, display device 710 may include more than one screen. The screen or screens of the display device may be implemented using any of a variety of different technologies including, but not limited to, those noted herein.

In another embodiment, VR headset 700 may include a screen that is integrated therein and capable of stereoscopic operation. In that case, for example, the screen may not be removable or part of another removable device. Appreciably, where VR headset 700 includes an integrated, non-removable screen, VR headset 700 is adapted to include the necessary mounting structures, fasteners, and/or adhesives to secure the screen. The screen may be implemented substantially as described within this disclosure. The screen may be implemented using any of a variety of different technologies including, but not limited to, those noted herein.

In still another embodiment, VR headset 700 may include two screens integrated therein as opposed to a single screen. The screens may not be removable or part of a removable device. In some cases, each screen may be fixed to a respective eyepiece 715, 720. Further, in some cases, eyepieces 715 and 720 are capable of adjustment so that the distance between eyepieces 715 and 720 can be changed to accommodate inter-pupillary distance (IPD). In the case where eyepieces 715 and 720 are adjustable to accommodate IPD, each screen may be configured to move in unison with the respective eyepiece to which that screen is fixed so that the distance between the screens changes with the distance between eyepieces 715 and 720. The screens may be implemented using any of a variety of different technologies including, but not limited to, those noted herein.

Each of eyepieces 715 and 720 may be implemented as a module or assembly capable of receiving and securely holding any of the optical systems described herein in connection with FIGS. 1A, 2A, 3A, 4A, and 5A. It should be appreciated that eyepieces 715 and 720 may be matched. In other words, the same optical system implementation used for eyepiece 715 may be used for eyepiece 720. As discussed, the position of eyepieces 715 and 720 may be moved closer or farther from the user's eye and/or screen 735.

Frame 705 may also include processing and control circuitry 740. Examples of processing and control circuitry 740 may include, but are not limited to, motion detection systems, control systems, input devices, interface circuitry capable of coupling (e.g., physically and/or electrically) with display device 710 (or other screen or screens), audio circuitry and/or audio interface(s), wireless transceivers, interface circuitry for coupling to other systems external to VR headset 700, and so forth. For example, processing and control circuitry 740 may include audio jacks, communication ports, and so forth. Frame 705 may further include a power source 745 such as a battery or batteries. The batter(ies) may be rechargeable. In another example, power source 745 may be a power adapter interface, a receptacle, etc. to couple an external power source such as a power adapter to VR headset 700 and/or a rechargeable battery included therein.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise. As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

As defined herein, the terms "one embodiment," "an embodiment," "one or more embodiments," or similar language mean that a particular feature, structure, or characteristic described in connection with the embodiment is included in at least one embodiment described within this disclosure. Thus, appearances of the phrases "in one embodiment," "in an embodiment," "one or more embodiments," and similar language throughout this disclosure may, but do not necessarily, all refer to the same embodiment. The terms "embodiment" and "arrangement" are used interchangeably within this disclosure.

The terms first, second, etc. may be used herein to describe various elements. These elements should not be limited by these terms, as these terms are only used to distinguish one element from another unless stated otherwise or the context clearly indicates otherwise.

The corresponding structures, materials, acts, and equivalents of all means or step plus function elements that may be found in the claims below are intended to include any structure, material, or act for performing the function in combination with other claimed elements as specifically claimed.

The description of the embodiments provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the embodiments provided herein. Accordingly, reference should be made to the following claims, rather than to the foregoing disclosure, as indicating the scope of such features and implementations.

What is claimed is:

1. An optical system, comprising, from an image side to an object side:
   a first lens having a positive refractive power;
   a second lens having a positive refractive power; and
   a third lens having a negative refractive power;

wherein the first lens, the second lens, and the third lens form an optical path with the object side facing a screen and the image side adapted to provide an image from the screen to a user;

wherein the optical system is configured to satisfy at least one of:

a first pair of expressions comprising a first expression $1.0<OAL/f<1.8$ and a second expression $0.0<D1/f<0.2$, where OAL is distance from an image side of the first lens to a surface of the screen on the object side, D1 is air space thickness between the first lens and the second lens, and f is overall focal length of the optical systems;

a second pair of expressions comprising a first expression $0.2<BFL/f<0.9$ and a second expression $0.0<D2/f<0.4$, where BFL is a distance from an object side of the third lens to a surface of the screen on the object side, D2 is air space thickness between the second lens and the third lens, and f is overall focal length of the optical system;

a third pair of expressions comprising a first expression $-1.0<r2/f<-0.2$ and a second expression $0.5<r3/f<2.5$, where r2 is a radius of curvature of a surface of the first lens facing the object side, f is overall focal length of the optical system, and r3 is a radius of curvature of a surface of the second lens facing the image side; or a fourth pair of expressions comprising a first expression $-5.0<r4/f<-0.5$ and a second expression $-20<r5/f<-0.5$, where r4 is a radius of curvature of a surface of the second lens facing the object side, f is overall focal length of the optical system, and r5 is a radius of curvature of a surface of the third lens facing the image side.

2. The optical system of claim 1, configured to satisfy a first expression $0.8<f1/f<2.2$ and a second expression $0.8<f2/f<1.9$, where f is overall focal length of the optical system, f1 is focal length of the first lens, and f2 is focal length of the second lens.

3. The optical system of claim 1, configured to satisfy a first expression $-1.0<f3/f<-0.4$ and a second expression $0.4<f1/f2<2.0$, where f is overall focal length of the optical system, f1 is focal length of the first lens, f2 is focal length of the second lens, and f3 is focal length of the third lens.

4. The optical system of claim 1, configured to satisfy a first expression $-3.0<f2/f3<-0.8$ and a second expression $|Vd2-Vd3|>24$, where f2 is focal length of the second lens, f3 is focal length of the third lens, Vd2 is an Abbe number of optical material of the second lens, and V3 is an Abbe number of optical material of the third lens.

5. The optical system of claim 1, wherein the optical system corrects at least one of:

a group of aberrations including astigmatism and field curvature; or lateral color.

6. The optical system of claim, wherein the optical system corresponds to each of a plurality of eyepieces included in a virtual-reality head-mountable assembly, the head-mountable assembly adapted to receive a display device.

7. The optical system of claim 6, wherein each of the plurality of eyepieces corresponds to a removable lens module.

8. The optical system of claim 6, wherein the screen is part of a display device.

9. An optical system for producing an image, comprising:

a plurality of lenses forming an optical path having an object side facing a screen and an image side adapted to provide an image from the screen to a user, wherein the plurality of lenses corrects lateral color to less than one milliradian by providing less than approximately ±1 diopter (dP) of user eye accommodation for a field covering at least ±45° (90°) full field of view for the screen, at the object side, having a diagonal of at least 62 mm.

10. The optical system of claim 9, wherein the optical system corresponds to each of a plurality of eyepieces included in a virtual-reality head-mountable assembly, the head-mountable assembly adapted to receive a display device including the screen.

11. The optical system of claim 10, wherein each of the plurality of eyepieces corresponds to a removable lens module.

12. The optical system of claim 10, wherein the display device is a mobile phone.

13. The optical system of claim 9, wherein:

the plurality of lenses provide an eye relief of at least 10 mm.

14. The optical system of claim 9, wherein:

the plurality of lenses provide an eye box diameter of between approximately 12 mm and 16 mm for a pupil of the user.

15. The optical system of claim 9, wherein the plurality of lenses comprise, from the image side to the object side:

a first lens with a positive refractive power;

a second lens with positive refractive power; and a third lens with a negative refractive power.

16. A method of providing an optical system, comprising:

locating a first lens having a positive refractive power at a position at an image side of an optical path;

providing a second lens having a positive refractive power; and locating a third lens having a negative refractive power at an object side of the optical path, wherein the second lens is positioned between the first lens and the third lens;

wherein the first lens, the second lens, and the third lens form the optical path with the object side facing a screen and the image side adapted to provide an image from the screen to a user;

wherein the optical system is configured to satisfy at least one of:

a first pair of expressions comprising a first expression $1.0<OAL/f<1.8$ and a second expression $0.0<D1/f<0.2$, where OAL is distance from an image side of the first lens to a surface of the screen on the object side, D1 is air space thickness between the first lens and the second lens, and f is overall focal length of the optical systems;

a second pair of expressions comprising a first expression $0.2<BFL/f<0.9$ and a second expression $0.0<D2/f<0.4$, where BFL is a distance from an object side of the third lens to a surface of the screen on the object side, D2 is air space thickness between the second lens and the third lens, and f is overall focal length of the optical system;

a third pair of expressions comprising a first expression $-1.0<r2/f<-0.2$ and a second expression $0.5<r3/f<2.5$, where r2 is a radius of curvature of a surface of the first lens facing the object side, f is overall focal length of the optical system, and r3 is a radius of curvature of a surface of the second lens facing the image side; or a fourth pair of expressions comprising a first expression $-5.0<r4/f<-0.5$ and a second expression −20<r5/f<−0.5, where r4 is a radius of curvature of a surface of the second lens facing the object side, f is overall focal length of the optical system, and r5 is a radius of curvature of a surface of the third lens facing the image side.

17. The method of claim 16, wherein the optical system is configured to satisfy a first expression 0.8<f1/f<2.2 and a second expression 0.8<f2/f<1.9, where f is overall focal length of the optical system, f1 is focal length of the first lens, and f2 is focal length of the second lens.

18. The method of claim 16, wherein the optical system is configured to satisfy a first expression −1.0<f3/f<−0.4 and a second expression 0.4<f1/f2<2.0, where f is overall focal length of the optical system, f1 is focal length of the first lens, f2 is focal length of the second lens, and f3 is focal length of the third lens.

19. The method of claim 16, wherein the optical system is configured to satisfy a first expression −3.0<f2/f3<−0.8 and a second expression |Vd2−Vd3|>24, where f2 is focal length of the second lens, f3 is focal length of the third lens, Vd2 is an Abbe number of optical material of the second lens, and V3 is an Abbe number of optical material of the third lens.

20. The method of claim 16, wherein the optical system corrects at least one of:
a group of aberrations including astigmatism and field curvature; or
lateral color.

21. The method of claim 16, further comprising:
providing the optical system as an eyepiece included in a virtual-reality head-mountable assembly, the head-mountable assembly adapted to receive a display device including the screen.

22. The method of claim 21, further comprising:
providing the eyepiece as part of a removable lens module.

23. The method of claim 16, wherein a display device is a mobile phone.

* * * * *